US011529901B2

(12) United States Patent
Smith et al.

(10) Patent No.: US 11,529,901 B2
(45) Date of Patent: Dec. 20, 2022

(54) GRAB BAR ASSEMBLY FOR A VEHICLE

(71) Applicant: KA Group AG, Zürich (CH)

(72) Inventors: Timothy Clayton Smith, The Woodlands, TX (US); Jesse L. Henrikson, Conroe, TX (US); Reyna Lynn Wygant, Conroe, TX (US)

(73) Assignee: KA Group AG, Zürich (CH)

(*) Notice: Subject to any disclaimer, the term of this patent is extended or adjusted under 35 U.S.C. 154(b) by 104 days.

(21) Appl. No.: 17/280,744

(22) PCT Filed: Sep. 28, 2018

(86) PCT No.: PCT/IB2018/057573
§ 371 (c)(1),
(2) Date: Mar. 26, 2021

(87) PCT Pub. No.: WO2020/065383
PCT Pub. Date: Apr. 2, 2020

(65) Prior Publication Data
US 2021/0354613 A1 Nov. 18, 2021

(51) Int. Cl.
*B60N 3/02* (2006.01)
(52) U.S. Cl.
CPC ............. *B60N 3/023* (2013.01); *B60N 3/026* (2013.01)
(58) Field of Classification Search
CPC ........... B60N 3/023; B60N 3/026; B60N 3/02
USPC ...................................................... 296/1.02
See application file for complete search history.

(56) References Cited

U.S. PATENT DOCUMENTS

| 2,913,251 A | 11/1959 | Herbenar |
| 2,973,208 A | 2/1961 | Gerner |
| 2,997,350 A | 8/1961 | Gerner |
| 3,395,951 A | 8/1968 | Barr et al. |
| 3,434,766 A | 3/1969 | Kampert et al. |
| 3,622,143 A | 11/1971 | Van Ranst, Jr. |

(Continued)

FOREIGN PATENT DOCUMENTS

| CN | 201109097 Y | 9/2008 |
| CN | 101775164 A | 7/2010 |

(Continued)

OTHER PUBLICATIONS

International Search Report for Application No. PCT/IB2018/057573 dated Jul. 8, 2019, 2 pages.

(Continued)

*Primary Examiner* — Jason S Morrow
(74) *Attorney, Agent, or Firm* — Howard & Howard Attorneys PLLC

(57) ABSTRACT

A grab bar assembly includes a support beam adapted to be mounted to a vehicle and defining a longitudinal axis, a grab bar having an inner beam disposed within the support beam and movable relative to the support beam in first and second directions along the longitudinal axis. The assembly further includes a locking plate attached to the inner beam and a locking mechanism coupled to the support beam and having a latch movable between a lock position engaging the locking plate to fix the grab bar in a location relative to the support beam and a release position disengaging the locking plate to permit adjustment of the grab bar and the inner beam along the longitudinal axis in one of the first and second directions.

23 Claims, 15 Drawing Sheets

(56) References Cited

U.S. PATENT DOCUMENTS

| | | | |
|---|---|---|---|
| 3,677,613 | A | 7/1972 | Houtz |
| 4,619,341 | A | 10/1986 | Davis |
| 4,765,757 | A | 8/1988 | Hartl |
| 4,883,319 | A | 11/1989 | Scott |
| 4,887,331 | A | 12/1989 | Thomas |
| 5,577,843 | A | 11/1996 | Leininger et al. |
| 7,445,188 | B2 | 11/2008 | Lamparter |
| 8,544,937 | B2 | 10/2013 | Orlowsky et al. |
| 8,678,457 | B1 | 3/2014 | Duderstadt |
| 9,022,445 | B1 | 5/2015 | Duderstadt |
| 9,290,133 | B1 | 3/2016 | Bishop |
| 9,387,810 | B1 | 7/2016 | Bishop |
| 10,589,653 | B2 * | 3/2020 | Takegami ............ B60N 3/026 |
| 2002/0111219 | A1 | 8/2002 | Kraine et al. |
| 2003/0215316 | A1 | 11/2003 | Burney et al. |
| 2008/0216734 | A1 | 9/2008 | Czipri |
| 2010/0310379 | A1 | 12/2010 | Livingston |
| 2016/0311356 | A1 | 10/2016 | Krajenke et al. |
| 2020/0070706 | A1 * | 3/2020 | Sellars ................. B60N 3/026 |

FOREIGN PATENT DOCUMENTS

| | | |
|---|---|---|
| CN | 202480051 U | 10/2012 |
| CN | 103273459 A | 9/2013 |
| CN | 203404243 U | 1/2014 |
| CN | 203937846 U | 11/2014 |
| CN | 104191929 A | 12/2014 |
| CN | 104421339 A | 3/2015 |
| CN | 104448422 A | 3/2015 |
| CN | 105295120 A | 2/2016 |
| CN | 105881451 A | 8/2016 |
| CN | 106633695 A | 5/2017 |
| CN | 206206409 U | 5/2017 |
| CN | 206559011 U | 10/2017 |
| CN | 107828091 A | 3/2018 |
| DE | 8226761 U1 | 12/1982 |
| DE | 102008012765 A1 | 9/2009 |
| DE | 102012000316 A1 | 7/2013 |
| DE | 102012002076 A1 | 8/2013 |
| EP | 0062712 B1 | 1/1985 |
| EP | 1069961 B1 | 10/2002 |
| EP | 1607556 B1 | 10/2006 |
| EP | 1683250 B1 | 2/2008 |
| EP | 1487312 B1 | 8/2011 |
| EP | 3103922 A1 | 12/2016 |
| FR | 2893291 A1 | 5/2007 |
| GB | 2547477 A | 8/2017 |
| KR | 19980053297 U | 10/1998 |
| KR | 20060007695 A | 1/2006 |
| SU | 36450 A1 | 5/1934 |
| WO | 2009041768 A2 | 4/2009 |

OTHER PUBLICATIONS

English language abstract for CN 201109097 Y extracted from espacenet.com database on Apr. 21, 2021, 1 page.
English language abstract for CN 101775164 A extracted from espacenet.com database on Apr. 21, 2021, 1 page.
English language abstract for CN 202480051 U extracted from espacenet.com database on Apr. 21, 2021, 1 page.
English language abstract for CN 103273459 A extracted from espacenet.com database on Apr. 21, 2021, 1 page.
English language abstract for CN 203404243 U extracted from espacenet.com database on Apr. 21, 2021, 1 page.
English language abstract for CN 203937846 U extracted from espacenet.com database on Apr. 21, 2021, 1 page.
English language abstract for CN 104191929 A extracted from espacenet.com database on Apr. 21, 2021, 1 page.
English language abstract for CN 104421339 A extracted from espacenet.com database on Apr. 21, 2021, 1 page.
English language abstract for CN 104448422 A extracted from espacenet.com database on Apr. 21, 2021, 1 page.
English language abstract for CN 105295120 A extracted from espacenet.com database on Apr. 21, 2021, 1 page.
English language abstract for CN 105881451 A extracted from espacenet.com database on Apr. 21, 2021, 1 page.
English language abstract for CN 106633695 A extracted from espacenet.com database on Apr. 21, 2021, 1 page.
English language abstract for CN 206206409 U extracted from espacenet.com database on Apr. 21, 2021, 1 page.
English language abstract for CN 206559011 U extracted from espacenet.com database on Apr. 21, 2021, 1 page.
English language abstract for CN 107828091 A extracted from espacenet.com database on Apr. 21, 2021, 1 page.
English language abstract for DE 82 26 761 U1 extracted from espacenet.com database on Apr. 21, 2021, 1 page.
English language abstract for DE 10 2008 012 765 A1 extracted from espacenet.com database on Apr. 21, 2021, 1 page.
English language abstract for DE 10 2012 000 316 A1 extracted from espacenet.com database on Apr. 21, 2021, 1 page.
English language abstract for DE 10 2012 002 076 A1 extracted from espacenet.com database on Apr. 21, 2021, 1 page.
English language abstract for EP 1 607 556 B1 extracted from espacenet.com database on Apr. 21, 2021, 1 page.
Computer-generated English language abstract for EP 3 103 922 A1 extracted from espacenet.com database on Apr. 21, 2021, 4 pages.
English language abstract for FR 2 893 291 A1 extracted from espacenet.com database on Apr. 21, 2021, 1 page.
Computer-generated English language abstract for KR 19980053297 U extracted from espacenet.com database on Apr. 21, 2021, 2 pages.
Computer-generated English language translation for KR 20060007695 A extracted from espacenet.com database on Apr. 21, 2021, 10 pages.
Partial computer-generated English language translation for SU 36450 A1 extracted from espacenet.com database on Apr. 21, 2021, 3 pages.

* cited by examiner

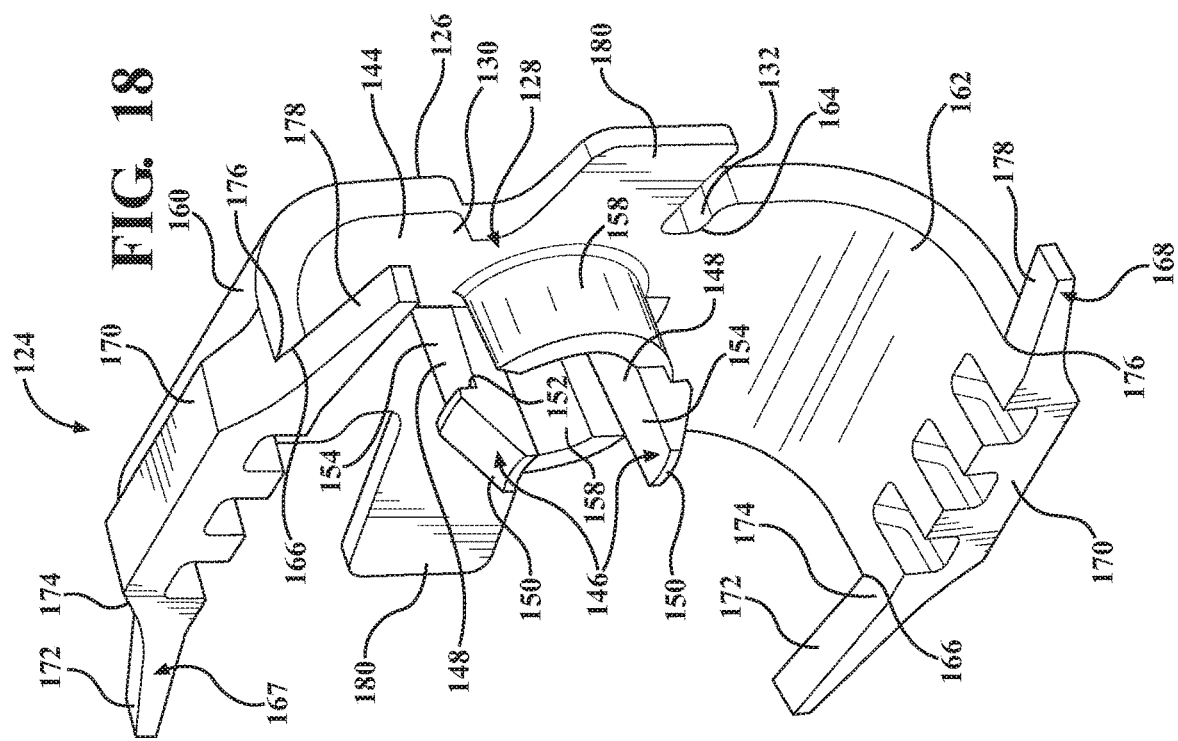
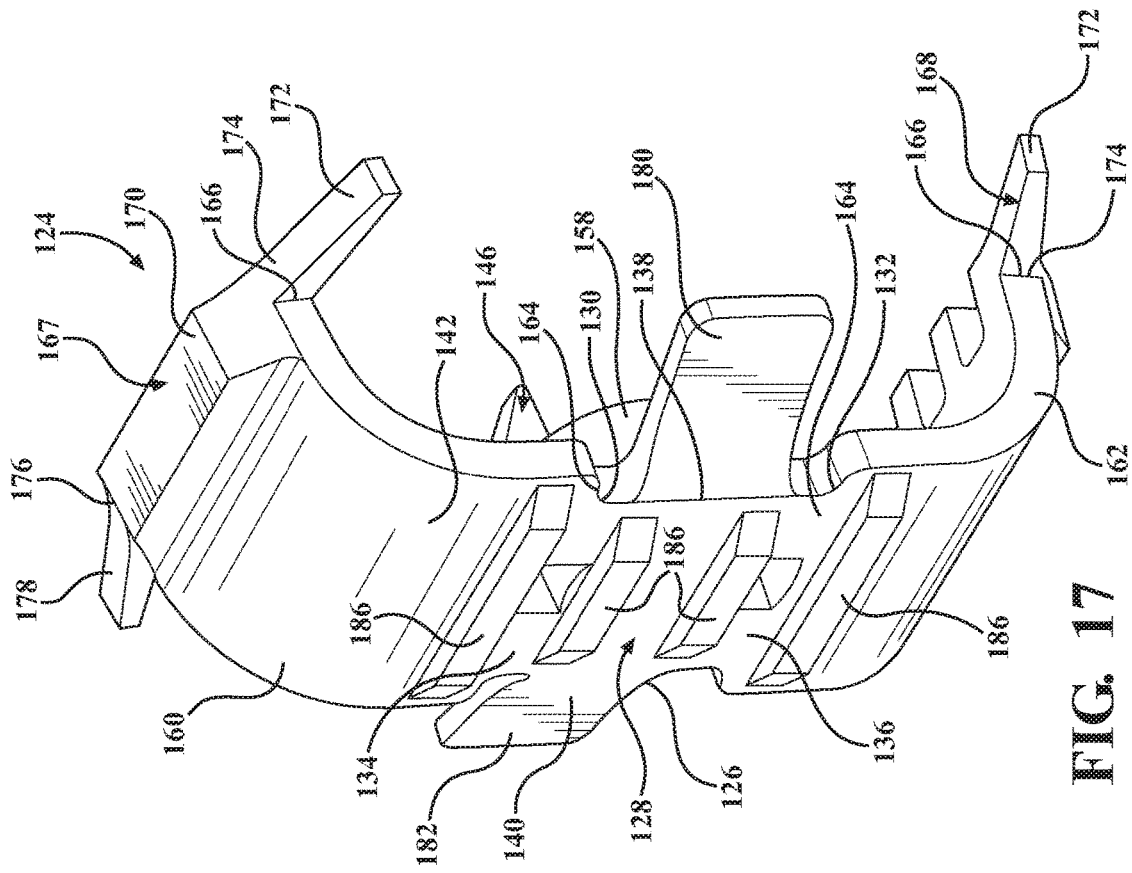

US 11,529,901 B2

GRAB BAR ASSEMBLY FOR A VEHICLE

CROSS-REFERENCE TO RELATED APPLICATIONS

This application is the National Stage of International Patent Application No. PCT/IB2018/057573, filed Sep. 28, 2018, the entire contents of which are hereby incorporated by reference.

FIELD OF THE DISCLOSURE

The present disclosure relates generally to a grab bar assembly for a vehicle.

BACKGROUND

Grab bars are often used in side-by-side or other off-road vehicles to enable a passenger to stabilize and/or steady himself/herself while entering the vehicle, while exiting the vehicle, and/or while the vehicle is in operation. The grab bar is typically attached to a dashboard of the vehicle, located over a footwell of a passenger side of the vehicle and extending toward the passenger seat. In certain configurations, the grab bar is adjustable to allow the passenger to adjust a position of the grab bar relative to the dashboard. For example, the grab bar assembly may have telescoping beams fixed in a passenger-selected position utilizing locking pins. Although effective, removal and/or insertion of the locking pins can be cumbersome. The present disclosure is aimed at resolving the issue identified above.

SUMMARY

A grab bar assembly for a vehicle is disclosed. The grab bar assembly comprises a support beam defining a longitudinal axis and a cavity extending along the longitudinal axis with the support beam adapted to be mounted to the vehicle, a grab bar having an inner beam disposed within the cavity of the support beam with the inner beam movable relative to the support beam in first and second directions along the longitudinal axis, a locking plate attached to the inner beam and movable with the inner beam during the movement of the inner beam, and a locking mechanism coupled to the support beam and having a latch movable between a lock position engaging the locking plate to fix the grab bar in a location relative to the support beam and a release position disengaging the locking plate to permit adjustment of the grab bar and the inner beam along the longitudinal axis in one of the first and second directions.

Also disclosed is an embodiment of a system for attaching a grab bar to a vehicle. The system includes a support beam defining a longitudinal axis and a cavity extending along the longitudinal axis with the support beam adapted to be mounted to the vehicle, an inner beam disposed within the cavity of the support beam with the inner beam movable relative to the support beam in first and second directions along the longitudinal axis, a locking plate attached to the inner beam and movable with the inner beam during the movement of the inner beam, and a locking mechanism coupled to the support beam and having a latch movable between a lock position engaging the locking plate to fix the grab bar in a location relative to the support beam and a release position disengaging the locking plate to permit adjustment of the grab bar and the inner beam along the longitudinal axis in one of the first and second directions.

Another embodiment of a system for attaching a grab bar to a vehicle is also disclosed. The system comprises a support beam defining a longitudinal axis and a cavity extending along the longitudinal axis with the support beam adapted to be mounted to the vehicle, an inner beam disposed within the cavity of the support beam with the inner beam movable relative to the support beam in first and second directions along the longitudinal axis, and a bushing attached one of the inner and support beams. The bushing has a body seated against the one of the inner and support beams and in contact with the other one of the inner and support beams, a locking finger extending transverse to the body with the locking finger configured to engage the one of the inner and support beams to attach the bushing to the one of the inner and support beams, and at least one spring coupled to the body with the spring having a center portion and at least one leg extending form the center portion with the at least one leg in direct contact with the one of the inner and support beams to bias the center portion in direct contact with the other one of the inner and support beams to form a close sliding fit between the inner and support beams.

BRIEF DESCRIPTION OF THE DRAWINGS

The advantages of the present disclosure will be readily appreciated as the same becomes better understood by reference to the following detailed description when considered in connection with the accompanying drawings. It should be appreciated that the drawings are purely illustrative and are not necessarily drawn to scale. Additionally, various features of the grab bar assembly may be generically or schematically illustrated in one or more of the figures.

FIG. 17 is a perspective view of a bushing for the grab bar assembly.

FIG. 18 is another perspective view of the bushing for the grab bar assembly.

DETAILED DESCRIPTION

Referring now to the figures, wherein like numerals indicate corresponding parts throughout the several views, embodiments of a grab bar assembly 20 are shown throughout the figures and described in detail below. The grab bar assembly 20 is coupled to a vehicle 10, such as a side-by-side vehicle. The side-by-side vehicle is generally known as a two-to-six person off-road vehicle, and may also be referred to as a utility task vehicle (UTV), a recreational off-highway vehicle (ROV), or a multipurpose off-highway utility vehicle (MOHUV). Unlike all-terrain vehicles (ATVs), the side-by-side vehicle has a side-by-side seating arrangement (driver-by-passenger arrangement), a steering wheel, and vehicle operation pedals (such as a gas pedal and a brake pedal). It should be appreciated that the grab bar assembly 20 can be used in any type of vehicle, including ATVs, passenger cars, trucks, or other transportation vehicles.

Figure 1:
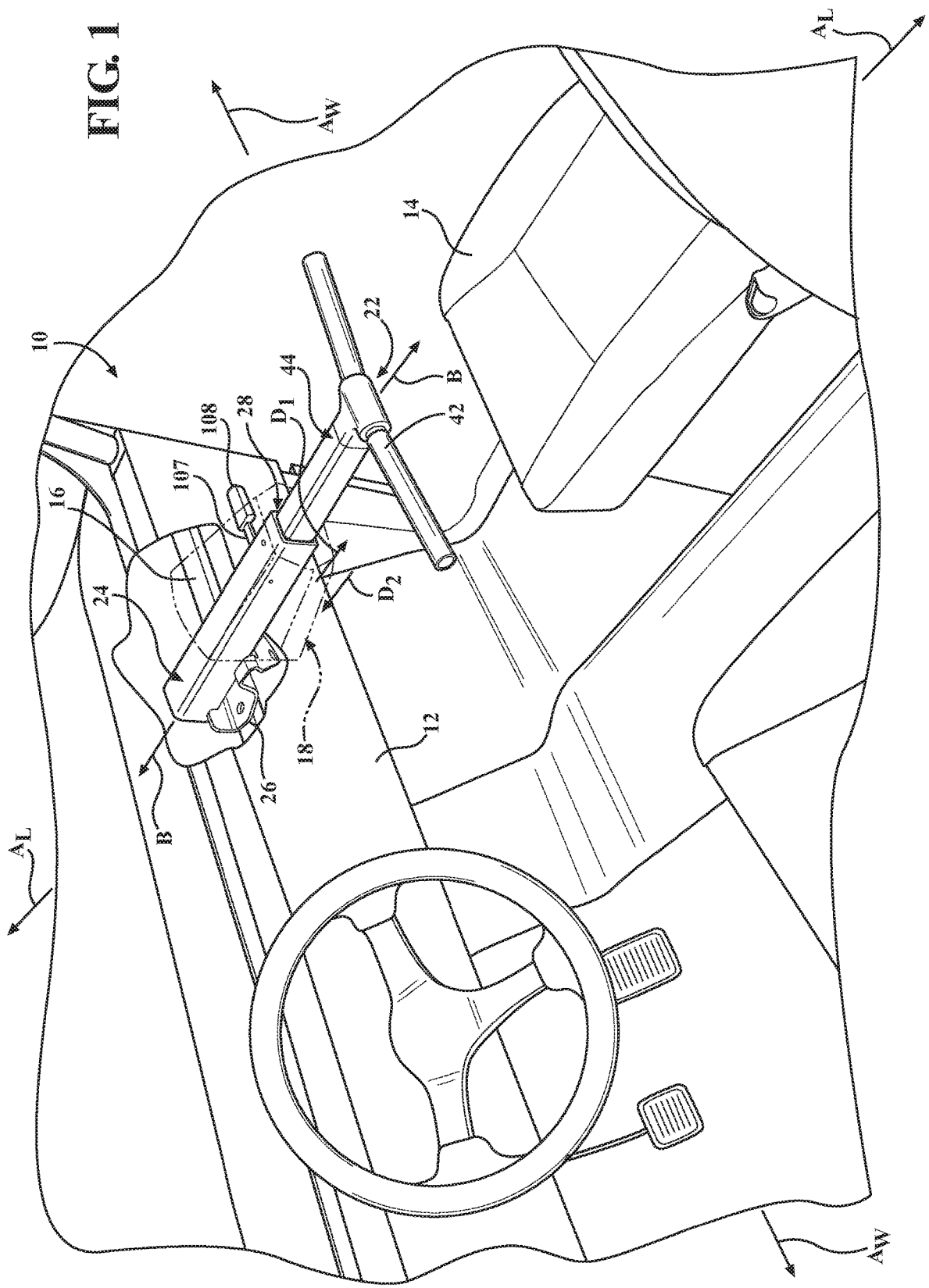
FIG. 1 is a semi-schematic, perspective view of a portion of a vehicle including a grab bar assembly according to an embodiment of the present disclosure.
Figure 2:
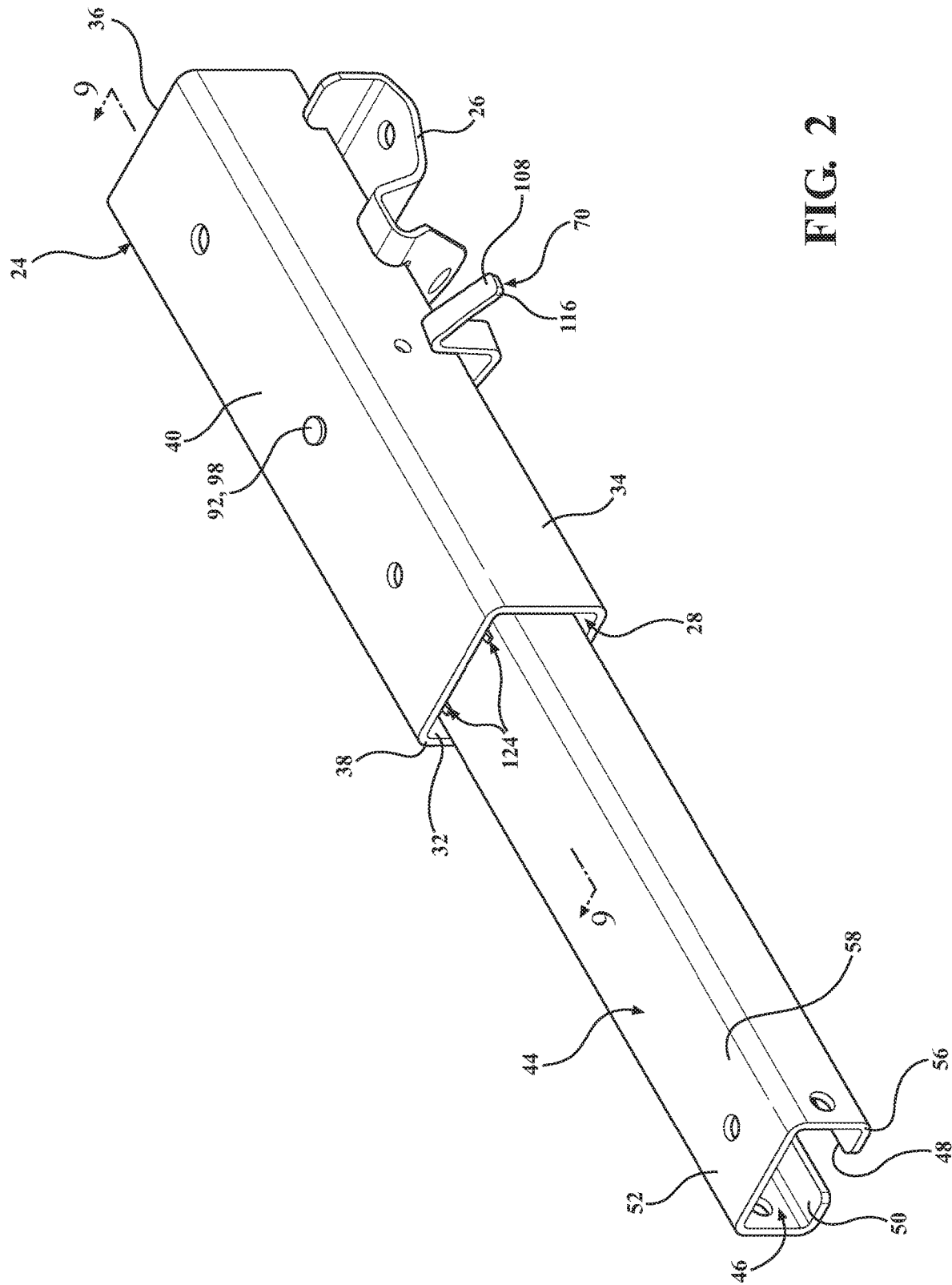
FIG. 2 is a top perspective view of the grab bar assembly with a handle of the grab bar removed.
Figure 3:
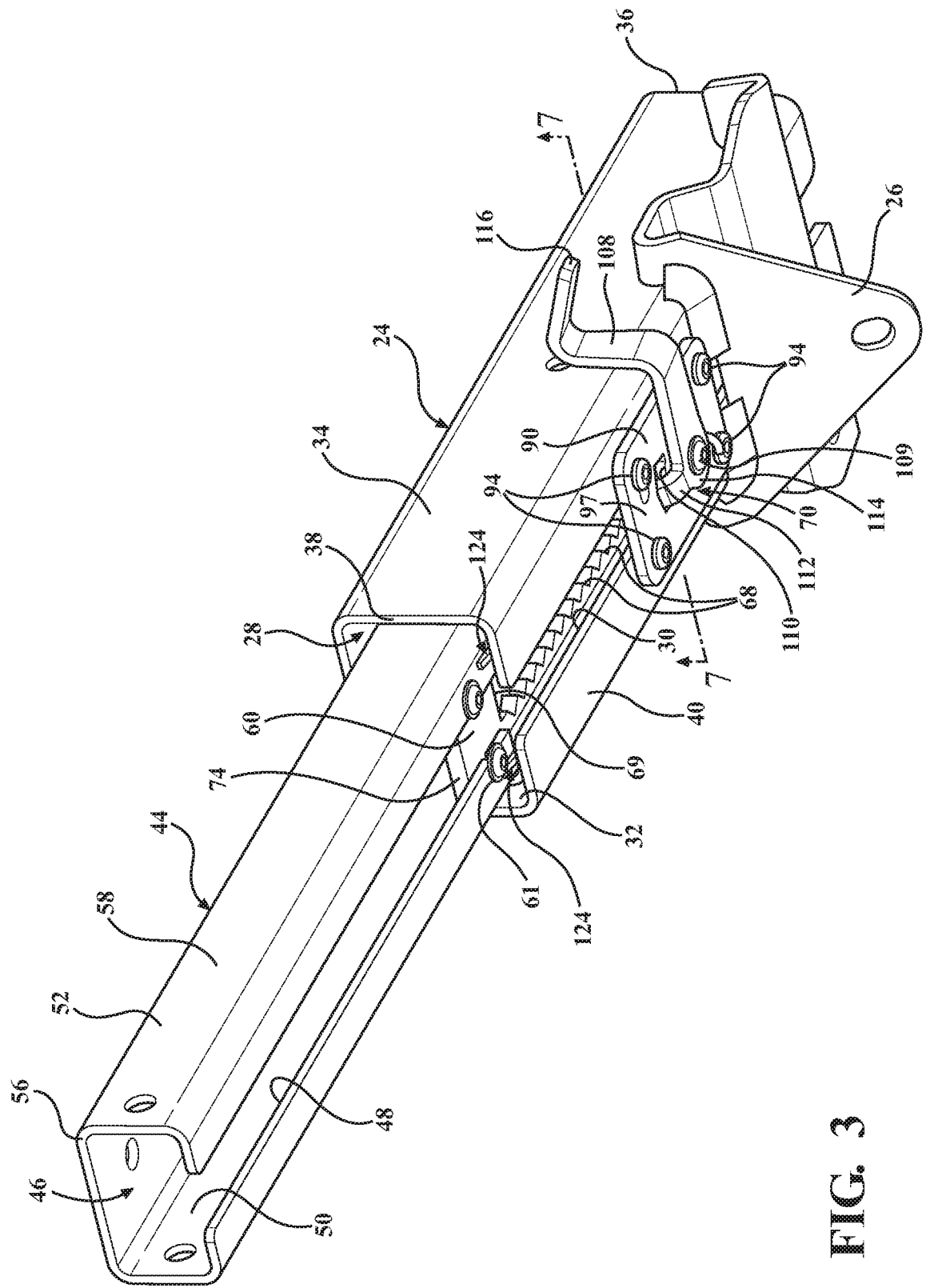
FIG. 3 is a bottom perspective view of the grab bar assembly with the handle of the grab bar removed.

In the embodiments described below, the grab bar assembly 20 is coupled to the dashboard 12 on a passenger-side of the side-by-side vehicle 10. This is shown in FIG. 1. The grab bar assembly 20 extends from the dashboard 12 toward a passenger seat 14 of the vehicle 10. The vehicle 10 defines a lengthwise axis $A_L$ and a widthwise axis $A_W$, and the grab bar assembly 20 includes a grab bar 22 having a handle 42 adapted to extend along the widthwise axis $A_W$ and transverse to the lengthwise axis $A_L$. Alternatively, the grab bar assembly 20 could be attached at any suitable location within the vehicle 10 and/or the handle 42 of the grab bar 22 can have any arrangement relative to the axes $A_L$, $A_W$ to allow for easy access by the passenger of the vehicle 10, the driver of the vehicle 10, or both.

In the embodiment shown in FIG. 1, the handle 42 has a T-shaped configuration, with the base of the T attached to the second inner beam end 56 of the inner beam 44. In an alternative embodiment, the handle 42 could have a U-shaped configuration. In this example, the vehicle 10 could have two grab bar assemblies 20, with one assembly 20 attached to one end of the U and the other assembly 20 attached to the other end of the U. Other configurations of the handle 42 are also contemplated.

Details of the grab bar assembly 20 are described below with reference to FIGS. 1-18. The grab bar assembly 20 has a support beam 24 adapted to be mounted to the vehicle 10. In an embodiment, the grab bar assembly 20 includes a mounting bracket 26 for mounting the support beam 24 to the vehicle 10. For example, and with reference to FIG. 1, the mounting bracket 26 is configured to mount the support beam 24 directly to a vehicle frame 16 located behind the dashboard 12, and the support beam 24 extends through an aperture defined in the dashboard 12. It should be appreciated that the support beam 24 could be coupled to the vehicle 10 in any way and/or by any suitable means, and not necessarily with a mounting bracket 26. In an embodiment, the vehicle 10 could include a shroud 18 mounted to the dashboard 12 and/or the vehicle frame 16 with the support beam 24 at least partially disposed within the shroud 18.

With reference to FIGS. 2-5, 7, and 9, the support beam 24 defines a longitudinal axis B and has a length $L_{SB}$ extending along the longitudinal axis B. The support beam 24 further defines a cavity 28 extending along the longitudinal axis B, and a support beam slot 30 formed therein along the longitudinal axis B. The support beam slot 30 has a width $W_{SBS}$ and a length $L_{SBS}$. In the illustrated embodiment, the width $W_{SBS}$ is consistent along the length $L_{SBS}$ of the support beam slot 30. The support beam slot 30 may have any suitable configuration, and is open to the cavity 28 to provide access to the cavity 28 of the support beam 24.

The support beam 24 further has interior 32 and exterior 34 surfaces and first 36 and second 38 support beam ends. The support beam slot 30 extends from the first support beam end 36 to the second support beam end 38. Accordingly, the length $L_{SBS}$ of the support beam slot 30 is the same as the length $L_{SB}$ of the support beam 24. Additionally, the first 36 and second 38 support beam ends are open and each provides access to the cavity 28. In an alternative embodiment, the first support beam end 36 could be capped. In another alternative embodiment, the support beam slot 30 could partially extend between the first 36 and second 38 support beam ends. For example, the support beam 24 could define slot ends with one of the slot ends spaced inwardly from the first support beam end 36 and the other slot end spaced inwardly from the second support beam end 38.

The support beam 24 may have any suitable configuration. In an embodiment, the support beam 24 is formed of at least one wall 40 defining a C-shaped configuration in cross-section. For example, and as shown, the at least one wall 40 of the support beam 24 defines flat portions and curved portions, with adjacent flat portions arranged at a right angle relative to one another and a curved portion between the adjacent flat portions to define the C-shaped configuration resembling more of a rectangle in cross-section. In an alternative embodiment, the at least one wall 40 of the support beam 24 could be rounded to define the C-shaped configuration that is more circular or annular in cross-section. Other cross-sectional configurations of the support beam 24 are also contemplated.

Figure 9:
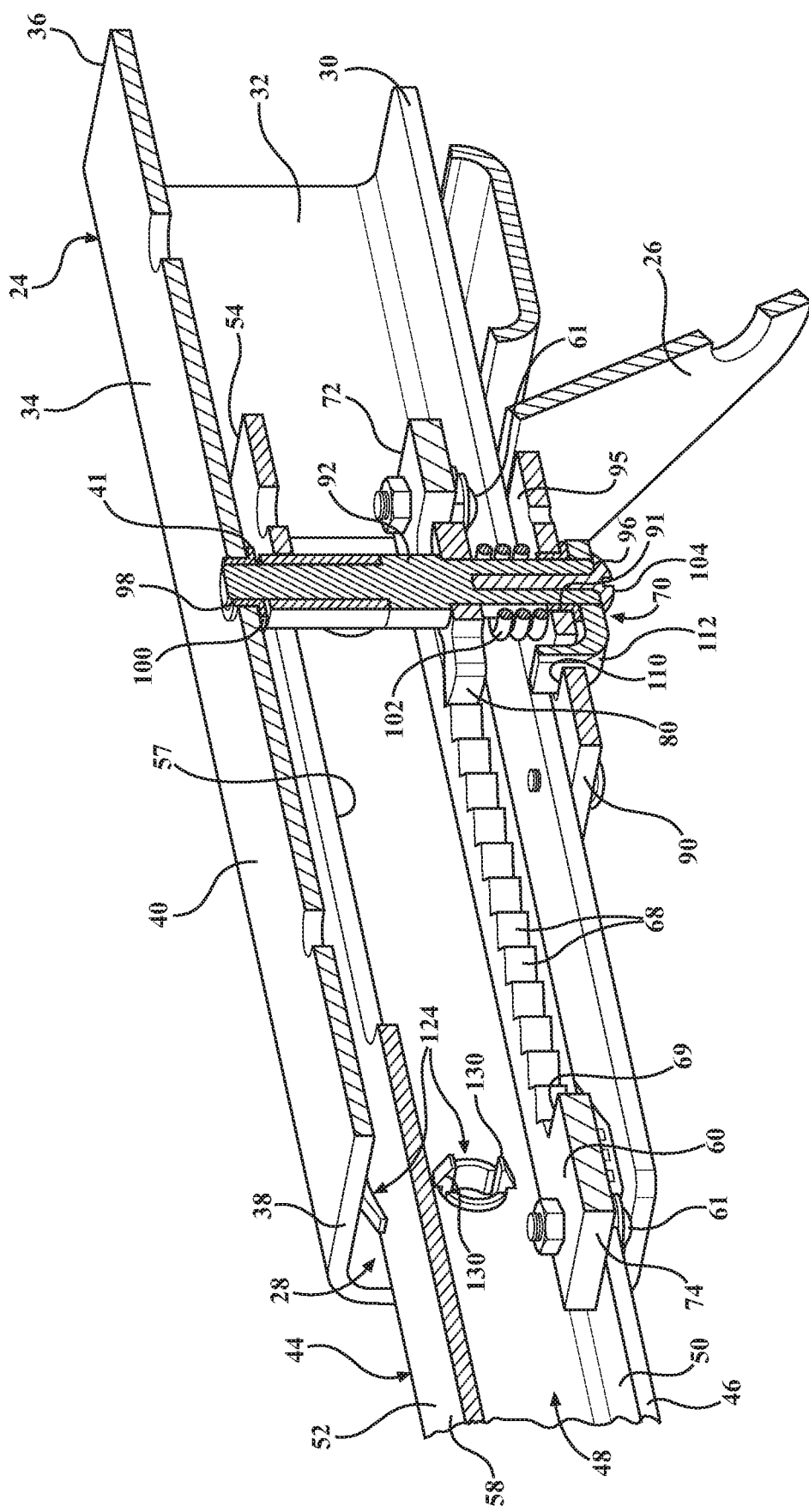
FIG. 9 a cross-sectional perspective view of a portion of the grab bar assembly taken along line 9-9 of FIG. 2.

As best shown in FIG. 9, the support beam 24 defines an aperture 41 opposite the support beam slot 30 for receiving and supporting a post 92 of a locking mechanism 70. Details of the locking mechanism 70 are described below.

The grab bar assembly 20 further includes the grab bar 22. As best shown in FIG. 1, the grab bar 22 has the handle 42 that the passenger can grasp while entering the vehicle 10, exiting the vehicle 10, and/or inside the vehicle 10 when the vehicle 10 is in operation. The grab bar 22 also has an inner beam 44 disposed within the cavity 28 of the support beam 24. Details of the inner beam 44 are described below with reference to FIGS. 1-9. Notably, the handle 42 of the grab bar 22 has been removed in each of FIGS. 2-9 for purposes of simplifying these figures.

Figure 4:
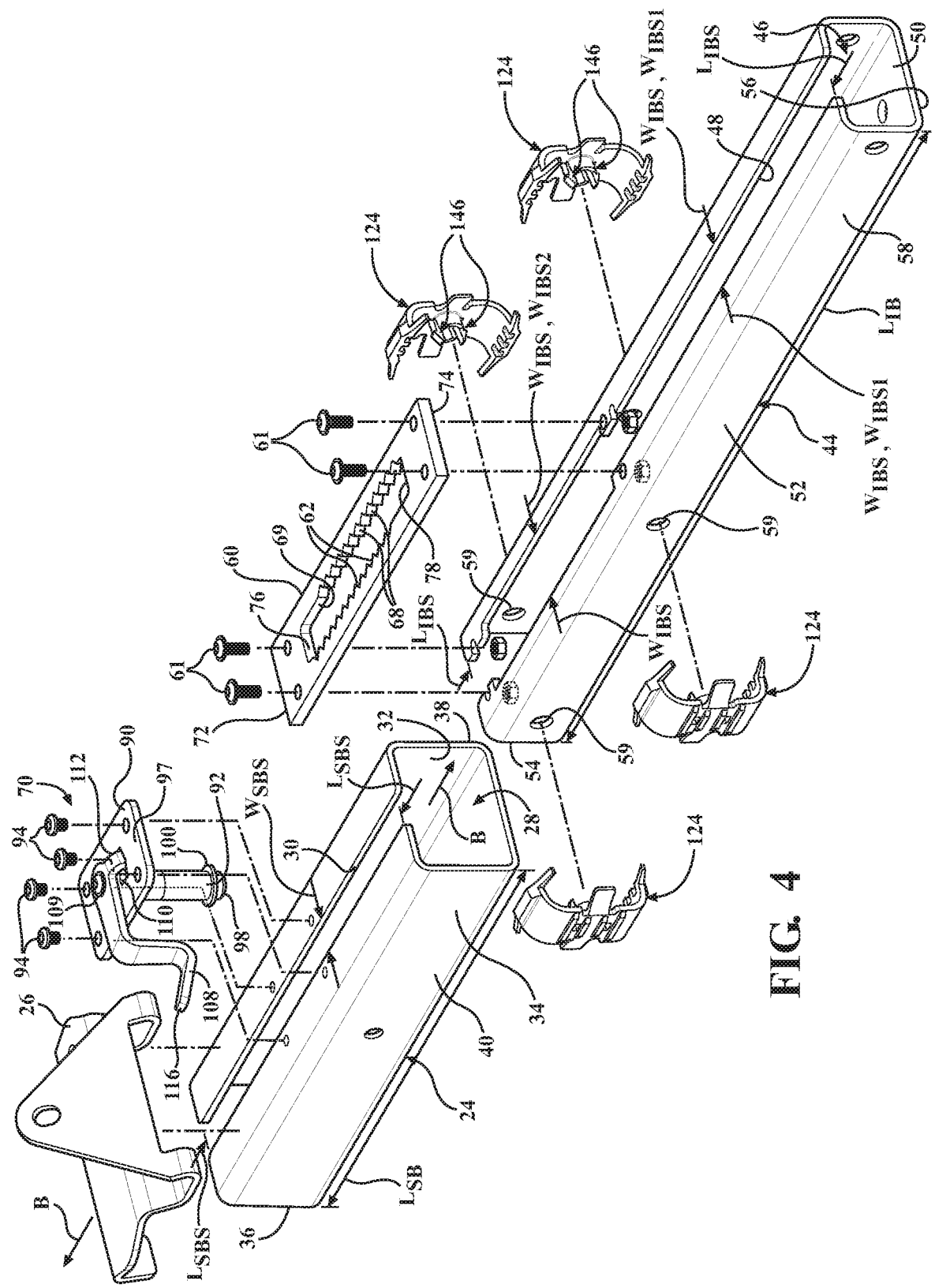
FIG. 4 is an exploded view of the grab bar assembly with the handle of the grab bar removed.

As shown, the inner beam 44 extends along the longitudinal axis B and is movable relative to the support beam 24. As described in further detail below at least with reference to FIGS. 1 and 11-16, the inner beam 44 is movable relative to the support beam 24 in first $D_1$ and second $D_2$ directions along the longitudinal axis B. The inner beam 44 has a length $L_{IB}$ extending along the longitudinal axis B. The inner beam 44 defines an inner beam cavity 46 extending along the longitudinal axis B, and an inner beam slot 48 formed therein along the longitudinal axis B. The inner beam slot 48 has a width Wcs and a length $L_{IBS}$. In the illustrated embodiment, the inner beam slot 48 has multiple widths $W_{IBS}$ along the length $L_{IBS}$. For instance, and as best shown in FIG. 4, the width Wcs of the inner beam slot 48 is further defined as a first width $W_{IBS1}$ with a portion of the inner beam slot 30 having the first width $W_{IBS1}$ and another portion of the inner beam slot 48 having a second width $W_{IBS2}$ that is larger than the first width $W_{IBS1}$. The first width $W_{IBS1}$ of the respective portion of the inner beam slot 48 is substantially the same as the width $W_{SBS}$ of the support beam slot 30. The second width $W_{IBS2}$ of the respective portion of the inner beam slot 30 is substantially the same as the width of an opening 69 of a locking plate 60. Details of the locking plate 60 are described below. The inner beam slot 48 may have any suitable configuration, and is open to the inner beam cavity 46 to provide access to the cavity 46 of the inner beam 44. In another embodiment, the inner beam slot 48 and the support beam slot 30 could have the same configuration.

The inner beam 44 has interior 50 and exterior 52 surfaces and first 54 and second 56 inner beam ends. The inner beam slot 48 extends from the first inner beam end 54 to the second inner beam end 56. Accordingly, the length $L_{IBS}$ of the inner beam slot 48 is the same as the length $L_{IB}$ of the inner beam 44. Additionally, the first 54 and second 56 inner beam ends are open such that each provides access to the inner beam cavity 46. In an alternative embodiment, the first inner beam end 54 could be capped. In another alternative embodiment, the inner beam slot 48 could partially extend between the first 54 and second 56 inner beam ends. For example, the inner beam 44 could define slot ends with one of the slot ends spaced from the first inner beam end 54 and the other slot end spaced from the second inner beam end 56.

Figure 6:
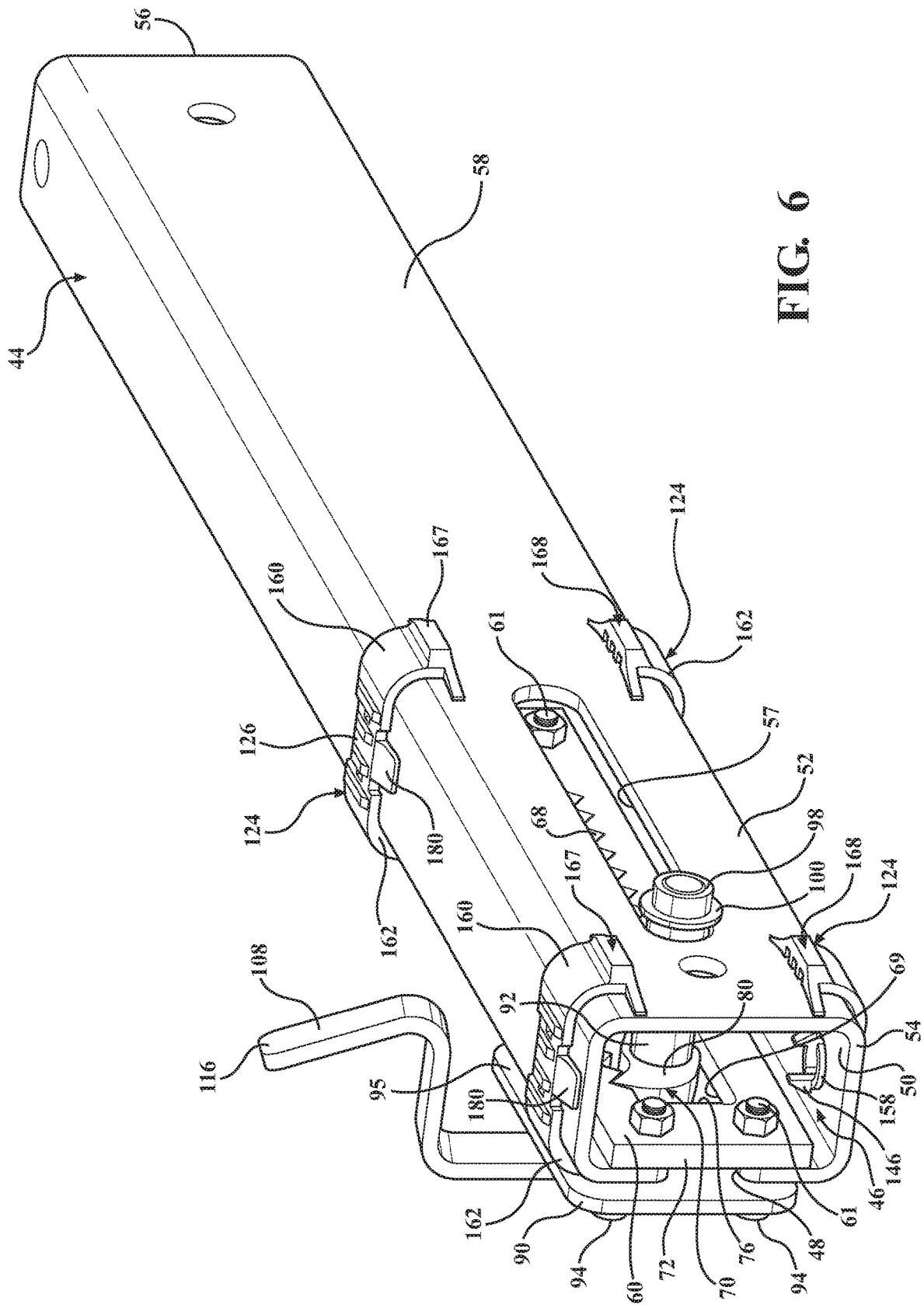
FIG. 6 is a perspective view of the grab bar assembly with the handle of the grab bar and a support beam removed.

In an embodiment, and as best shown in FIG. 6, the inner beam 44 further defines an opening 57 opposite the inner beam slot 48. The opening 57 is proximate to, but spaced from the first inner beam end 54 and extends partially along the length $L_{IB}$ of the inner beam 44. The opening 57 is configured to receive the post 92 of the locking mechanism 70 mentioned above.

The inner beam 44 further defines an aperture 59 for receiving at least a locking finger 146 of a bushing 124 for attaching the bushing 124 to the inner beam 44. As illustrated, the aperture 59 is one of a plurality of apertures 59, and the grab bar assembly 20 includes a plurality of bushings 124 with the locking finger(s) 146 of one of the bushings 124 disposed through a respective one of the apertures 59 to attach the bushing 124 to the inner beam 44. Further details of the bushing(s) 124 and how the bushing(s) 124 is/are attached to the inner beam 44 are described below.

The inner beam 44 may have any suitable configuration. In an embodiment, the inner beam 44 is formed of at least one wall 58 defining a C-shaped configuration in cross-section. The at least one wall 58 of the inner beam 44 defines flat portions and curved portions. The adjacent flat portions are arranged at a right angle relative to one another with a curved portion between the adjacent flat portions to define the C-shaped configuration resembling more of a rectangle in cross-section. In an alternative embodiment, the at least one wall 58 of the inner beam 44 could be rounded to define the C-shaped configuration that is more circular or annular in cross-section. Other cross-sectional configurations of the inner beam 44 are also contemplated.

The cross-sectional configuration of the inner beam 44 is similar to the cross-sectional configuration of the support beam 24 except that the inner beam 44 is smaller in terms of width, height, and/or diameter compared to the support beam 24. The smaller size enables the inner beam 44 to be received or disposed within the cavity 28 of the support beam 24 such that the inner beam 44 is telescopically movable within the cavity 28 relative to the support beam 24. Alternatively, the cross-sectional configuration of the inner beam 44 could be different than the cross-sectional configuration of the support beam 24 so long as the inner beam 44 is disposable within the cavity 28 and movable relative to the support beam 24.

Additionally, the inner 44 and support 24 beams are arranged such that the support beam slot 30 is aligned with the inner beam slot 48. When aligned, both the support beam slot 30 and the inner beam slot 48 are open to and provide access to the inner beam cavity 46. This is shown at least in FIG. 3.

Referring to FIGS. 3-16, the grab bar assembly 20 further includes the locking plate 60. The locking plate 60 is attached to the inner beam 44 and movable with the inner beam 44 during the movement of the inner beam 44. For example, the locking plate 60 (which is attached to the inner beam 44) moves with the inner beam 44 relative to the support beam 24 in the first $D_1$ and second $D_2$ directions along the longitudinal axis B. As best shown in FIGS. 3 and 5-9, the locking plate 60 is disposed within the inner beam cavity 46 of the inner beam 44 adjacent the inner beam slot 48. As mentioned above, the locking plate 60 defines the opening 69, and the locking plate 60 is positioned such that the opening 69 is aligned with the inner beam slot 48. The locking plate 60 is attached to the inner beam 44 with fasteners 61. It should be appreciated that the locking plate 60 could be attached to the inner beam 44 by any suitable means.

Figure 10:
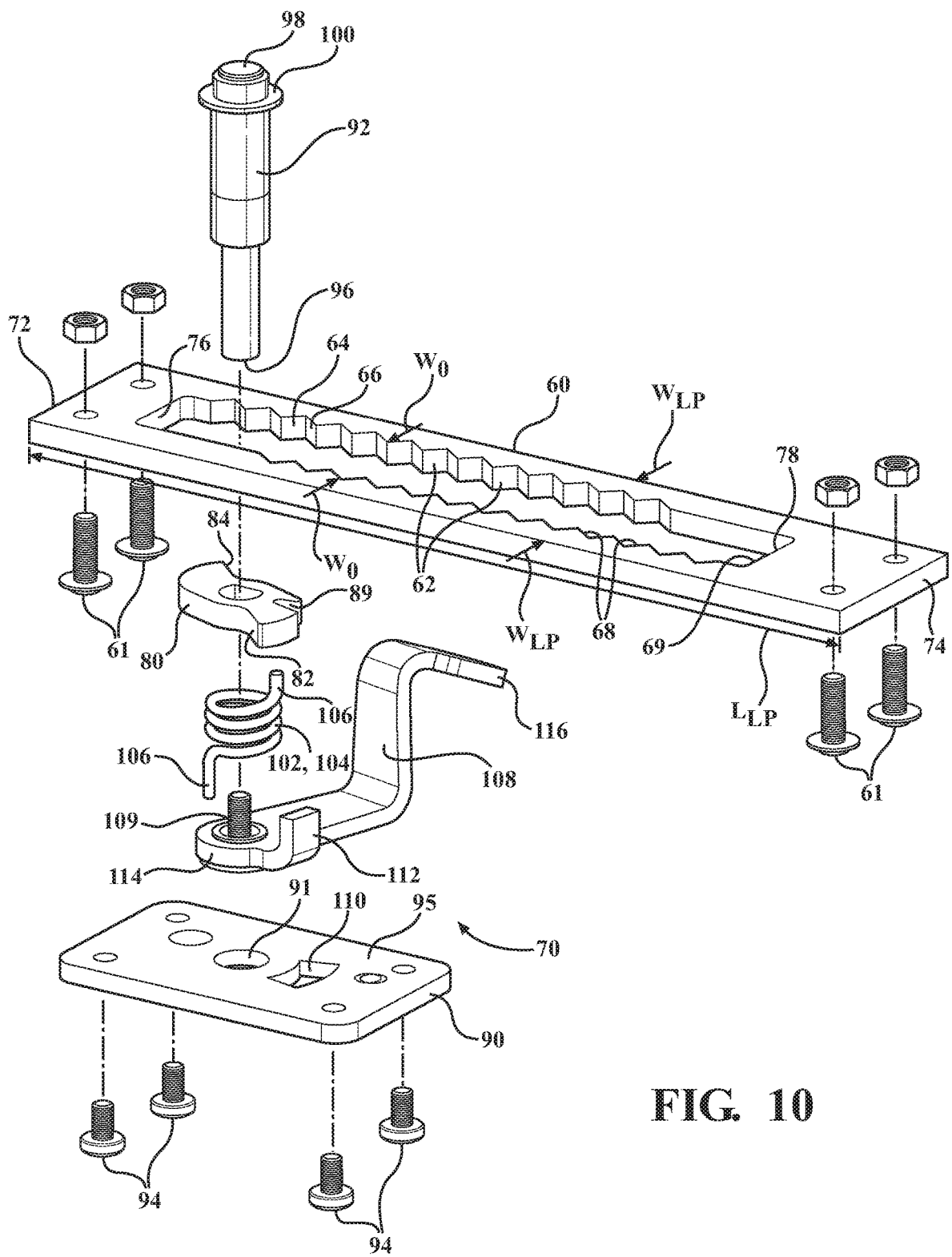
FIG. 10 is an exploded view of a locking plate and a locking mechanism of the grab bar assembly.

As shown in FIG. 10, the locking plate 60 has a width $W_{LP}$, and has a length $L_{LP}$ extending along the longitudinal axis B. The locking plate 60 may have any suitable width $W_{LP}$ so long as the locking plate 60 can be suitably disposed within and attached to the inner beam 44. Additionally, the locking plate 60 may have any suitable length $L_{LP}$.

Figure 12:
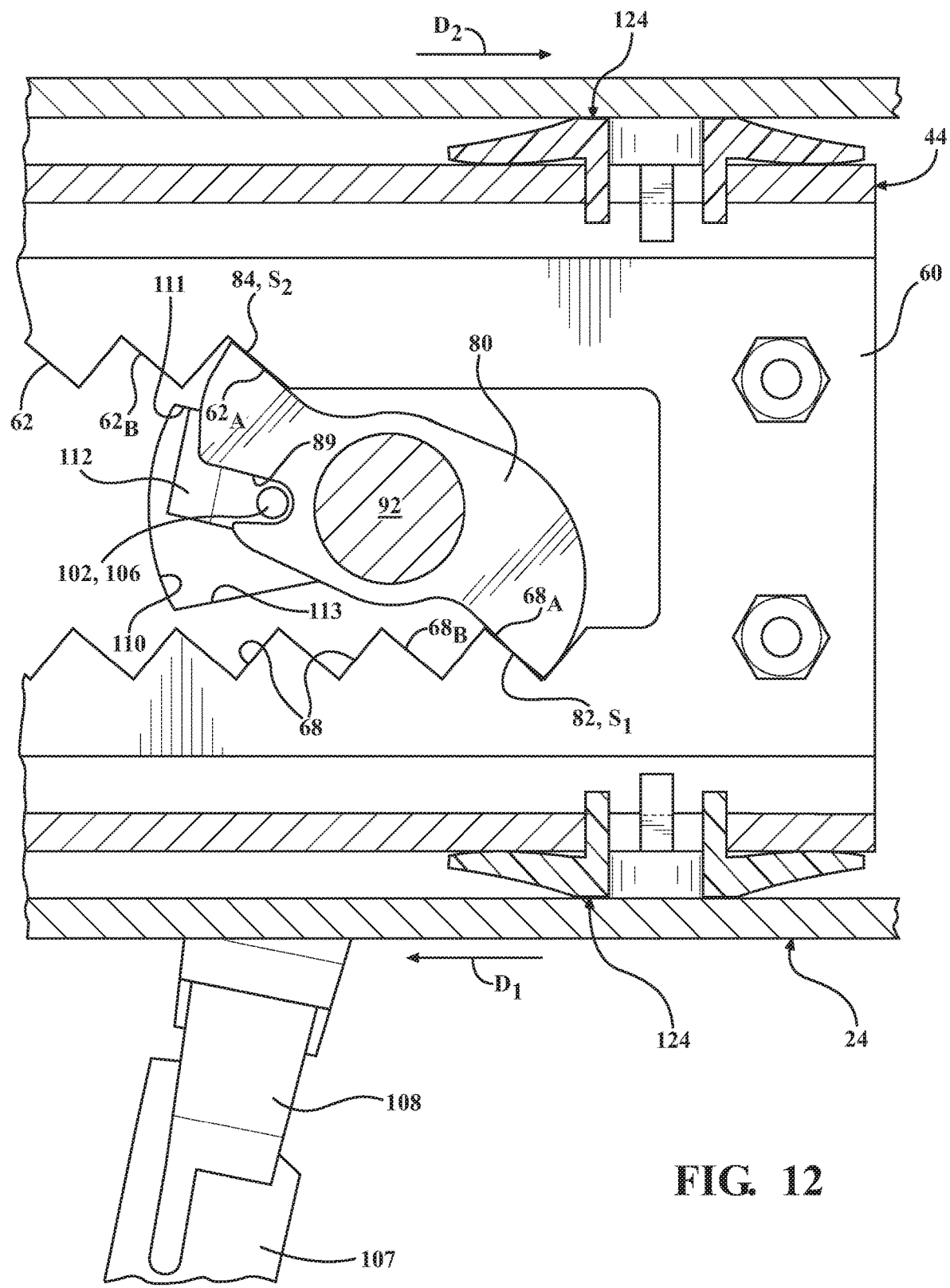
FIG. 12 is an enlarged view of a portion of the grab bar assembly of FIG. 11 with the latch shown in a lock position.

The locking plate 60 defines a plurality of discrete locking positions 62. The plurality of discrete locking positions 62 is aligned along the longitudinal axis B to form a row or series of discrete locking positions 62. Each locking position 62 has a specific size and detent configuration, and the plurality of discrete locking positions 62 has the same size and configuration. In an embodiment, the plurality of discrete locking positions 62 is further defined as a plurality of detents 62, with each detent 62 having a specific size and detent configuration. For example, each detent 62 has first 64 and second 66 detent surfaces arranged at an angle relative to one another. As best shown in FIG. 12, the first 64 and second 66 detent surfaces of each detent 62 are arranged at a right angle relative to one another. In an alternative embodiment, the first 64 and second 66 detent surfaces could be arranged at an acute angle relative to one another. Each of the first 64 and second 66 detent surfaces has a substantially flat surface. However, the first 64 and second 66 detent surfaces could have any suitable surface configuration. Additionally, each of the first 64 and second 66 detent surfaces has the same length. It is possible, however, that the first 64 and second 66 detent surfaces could have different lengths.

In an embodiment, the plurality of discrete locking positions 62 is further defined as a first plurality of discrete locking positions 62 arranged along the longitudinal axis B. The locking plate 60 further defines a second series of discrete locking positions 68 arranged along the longitudinal axis B opposite the first series of discrete locking positions 62. The second series of discrete locking positions 68 is spaced from the first series of discrete locking positions 62. The spacing between the first 62 and second 68 series of discrete locking positions forms the opening 69 of the locking plate 60. The opening 69 is open to the aligned support 30 and inner 48 beam slots, and is open to the inner beam cavity 46. Additionally, the opening 69 has a width Wo that varies along its length, which is due to the presence of the first 62 and second 68 series of locking positions. However, at its widest point, the width Wo of the opening 69 is about the same as the second width $W_{IBS2}$ of the inner beam slot 48.

Each of the first 62 and second 68 series of discrete locking positions extends along the length $L_{LP}$ of the locking plate 60. In an embodiment, and as shown at least in FIG. 11, the first 62 and second 68 series of discrete locking positions extend along the length $L_{LP}$ of the locking plate 60 but are offset from one another. For example, and as best shown in FIG. 10, a first locking position $62_A$ of the first series of locking positions 62 is offset from a corresponding first locking position $68_A$ of the second series of locking positions 68, a second locking position $62_B$ of the first series of locking positions 62 is offset from a corresponding second locking position $68_B$ of the second series of locking positions 68, and so on. In an alternative configuration, the first 62 and second 68 series of locking positions could be even with one another along the length $L_{LP}$ of the locking plate 60. In this alternative configuration, the first locking position $62_A$ of the first series of locking positions could be opposite the corresponding first locking position $68_A$ of the second series of locking positions 68, the second locking position $62_B$ of the first series of locking positions 62 could be opposite the corresponding second locking position $68_B$ of the second series of locking positions 68, and so on.

As shown, the first series of locking positions 62 has thirteen individual or discrete locking positions 62, and the second series of locking positions 68 has thirteen individual or discrete locking positions 68. The large number of discrete locking positions for each of the first 62 and second 68 series of locking positions advantageously enables a large number of discrete adjustments (thirteen adjustments in the illustrated embodiment) of the location of the grab bar 22 relative to the support beam 24 to accommodate many different sized passengers of the vehicle 10. It should be appreciated that each of the first 62 and second 68 series of locking positions can have any number of discrete locking positions, such as more or less than thirteen locking positions, for each of the first 62 and second 68 series of locking positions.

In an embodiment, the first series of discrete locking positions 62 is further defined as a first series of detents 62, and the second series of discrete locking positions 68 is further defined as a second series of detents 68. Each detent of the first series of detents 62 has a first detent configuration as described above, and each detent of the second series of detents 68 has a second detent configuration. In the illustrated embodiment, the first detent configuration is the same as the second detent configuration. Alternatively, the first detent configuration could be different from the second detent configuration.

The locking plate 60 further has opposing first 72 and second 74 ends. The first end 72 of the locking plate 60 is positioned adjacent the first inner beam end 54, and the second end 74 of the locking plate 60 is positioned between the first 54 and second 56 inner beam ends. The locking plate 60 defines a first stop 76 proximate the first end 72 of the locking plate 60, and further defines a second stop 78 proximate the second end 74 of the locking plate 60. As described in further detail below, the grab bar assembly 20 includes the locking mechanism 70 configured to interact with the first 62 and second 68 series of locking positions (such as with the first locking position $62_A$ of the first series 62 and the first locking position $68_A$ of the second series 68 simultaneously) to fix the grab bar 22 in a location relative to the support beam 24. The locking mechanism 70 is further configured to interact with the first 76 and second 78 stops of the locking plate 60 to limit movement of the grab bar 22 and the inner beam 44 relative to the support beam 24 along the longitudinal axis B.

Details of the locking mechanism 70 will now be described with reference to FIGS. 2-16. The locking mechanism 70 is coupled to the support beam 24 and extends through the inner 48 and support 30 beam slots to engage the locking plate 60. In an embodiment, the locking mechanism 70 has a latch 80 configured to engage the locking plate 60 when the latch 80 is in a lock position and configured to disengage the locking plate 60 when the latch 80 is in a release position. Further details of the movement of the latch 80 between the lock and release positions are described below.

In an embodiment, and as best shown in FIG. 12, the latch 80 is further defined as a pawl 80. The pawl 80 has a latch surface 82 configured to engage the locking plate 60 when the pawl 80 is in the lock position. In an embodiment, the latch surface 82 is further defined as a first latch surface 82 and the pawl 80 further has a second latch surface 84. Each of the first 82 and second 84 latch surfaces defines a slope $S_1$, $S_2$ with the slopes $S_1$, $S_2$ having a common configuration. In an embodiment, the first latch surface 82 has a first surface configuration and faces toward the first direction $D_1$, and the second latch surface 84 has a second surface configuration and faces toward the second direction $D_2$. As shown, each of the first 82 and second 84 latch surface configurations is substantially flat. Additionally, the first 82 and second 84 latch surfaces have a common length. Alternatively, the first 82 and second 84 latch surfaces could have different lengths. As noted above, each of the first series of detents 62 has the first detent configuration. The first surface configuration of the first latch surface 82 is complementary to the first detent configuration. As also noted above, each of the second series of detents 68 has the second detent configuration. The second surface configuration of the second latch surface 84 is complementary to the second detent configuration. The complementary surfaces enables the first latch surface 82 to suitably engage the detents of the first series of detents 62 and the second latch surface 84 to suitably engage the detents of the second series of detents 68 to lock the inner beam 44 in a location relative to the support beam 24. The pawl 80 further has a first arced or curved surface 86 adjacent the first latch surface 82, a second arced or curved surface 88 adjacent the second latch surface 84, and a slot 89 for receiving an arm 106 of a biasing member 102.

The locking mechanism 70 further has a base 90 fixed to the support beam 24 and the post 92 extending from the base 90 with the latch 80 coupled to the post 92. The base 90 may have any suitable configuration and serves as a support structure for the post 92 and the latch 80. The base 90 defines an aperture 91 for receiving the post 92, and an opening 110 for receiving a tab 112 of a lever 108. The base 90 further has inner 95 and outer 97 surfaces. The base 90 is fixed to the support beam 24 by any suitable means, such as with fasteners 94 or the like.

As previously mentioned, the locking mechanism 70 extends through the inner 48 and support 30 beam slots to engage the locking plate 60. For example, the post 92 of the locking mechanism 70 extends through the base 90 and through the aligned slots 30, 48, and the latch 80 coupled to the post 92 engages the locking plate 60. The post 92 also extends through the inner beam cavity 46 and through the opening 57 of the inner beam 44. The post 92 has first 96 and second 98 post ends with the first post end 96 adjacent to but spaced from the outer surface 97 of the base 90, and the second post end 98 disposed through the aperture 41 of the support beam 24 and exposed outside of the support beam 24.

Figure 5:
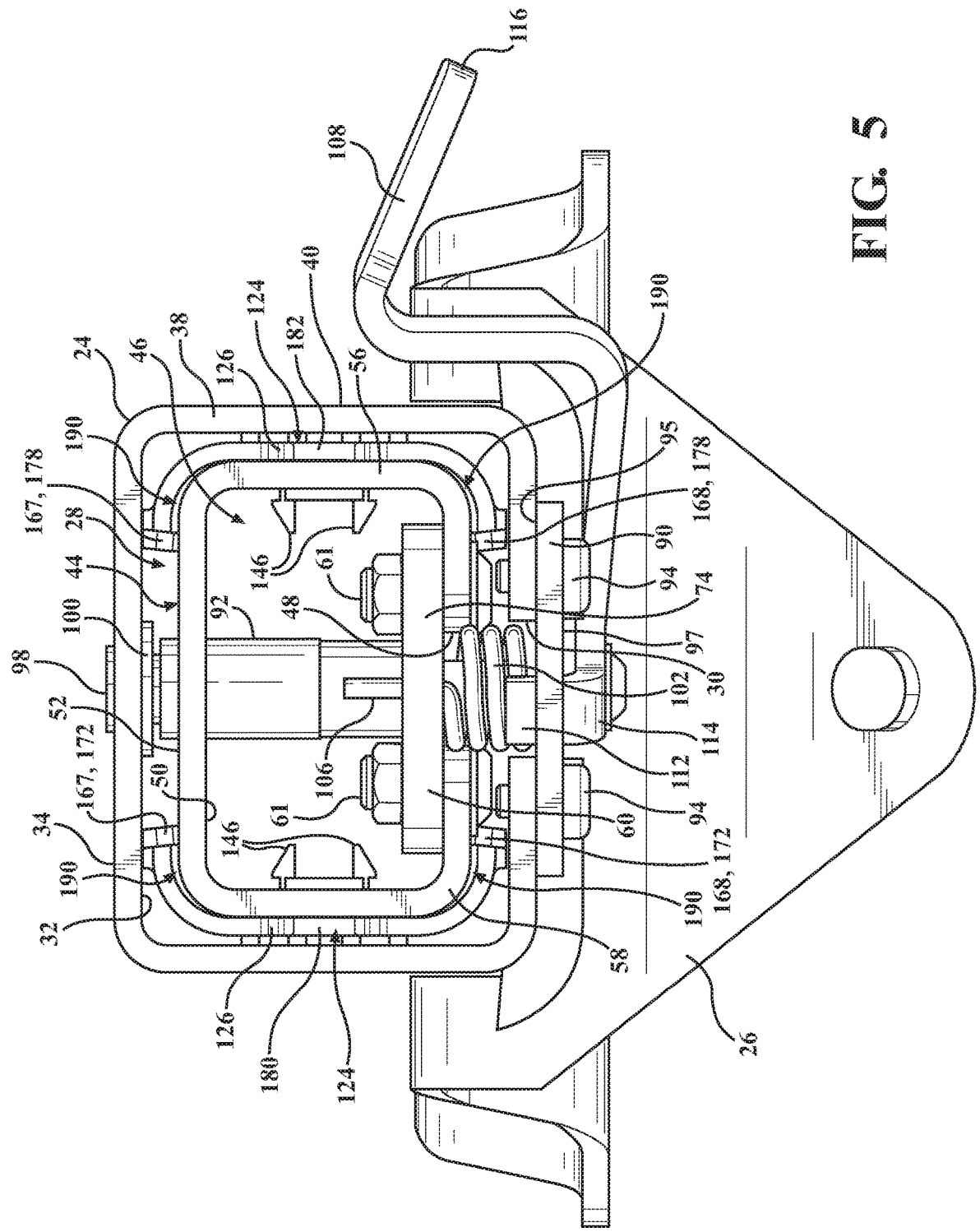
FIG. 5 is an end view of the grab bar assembly of FIG. 2.

The post 92 is shown as having a rounded or circular configuration. Alternatively, the post 92 can have any suitable configuration. Additionally, the diameter of the post 92 is less than the width of the aligned slots 30, 48 so that the post 92 can fit through the slots 30, 48 and extend into the inner beam cavity 46. As shown in FIGS. 5, 6, and 9, the post 92 further has a flange 100 proximate the second post end 98. The flange 100 is positioned between the support 24 and inner 44 beams, and the flange 100 is seated against the interior surface 34 of the support beam 24. Notably, the flange 100 is spaced from the exterior surface 52 of the inner beam 44.

Figure 11:
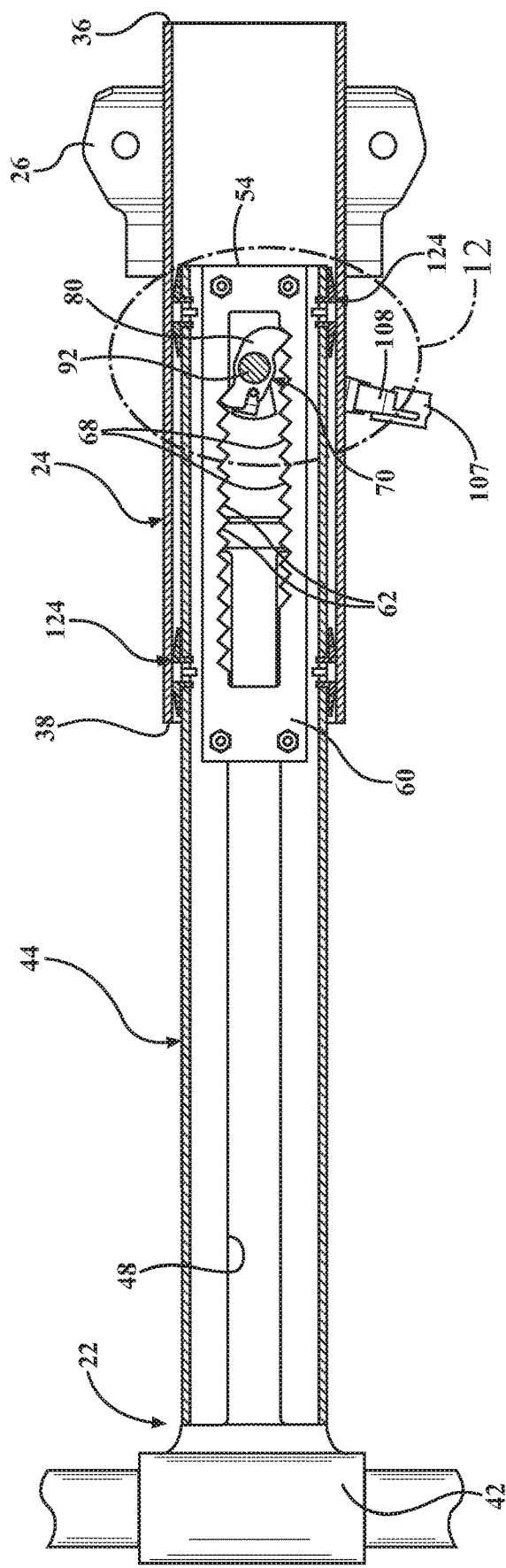
FIG. 11 is a cross-sectional, plan view of the grab bar assembly including a lever shown in a rest position and the inner beam and grab bar fixed in a location relative to the support beam.
Figure 14:
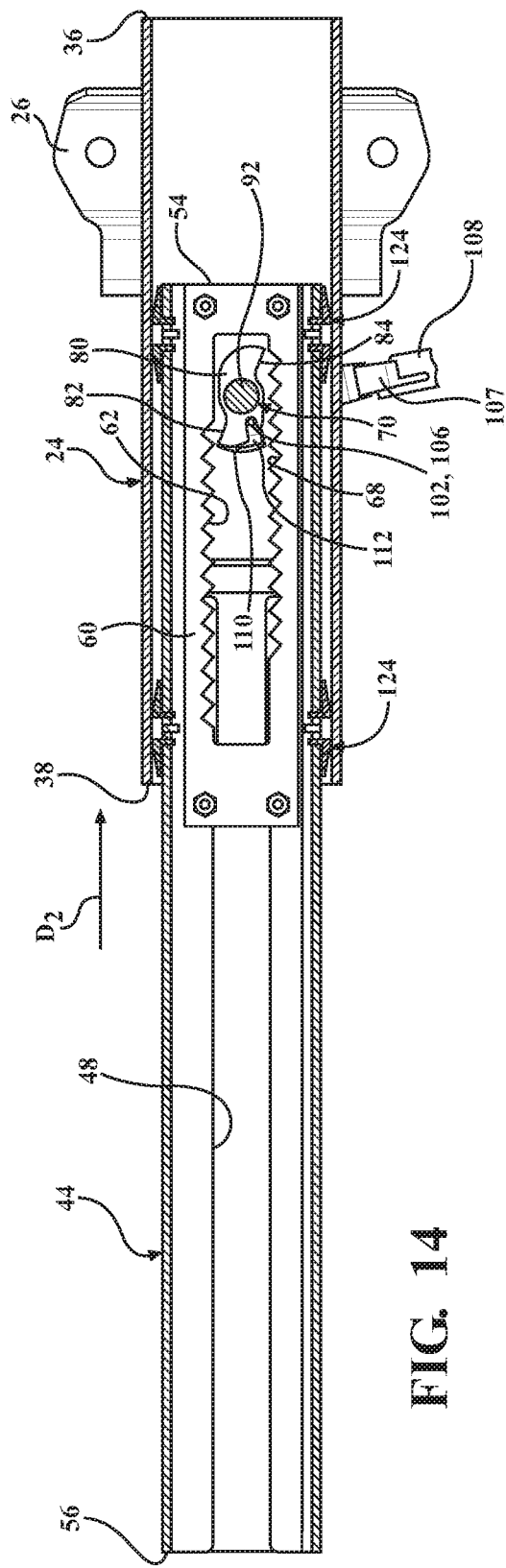
FIG. 14 is a cross-sectional, plan view of a portion of the grab bar assembly showing the latch in a release position to permit movement of the inner beam and grab bar along the longitudinal axis.
Figure 16:
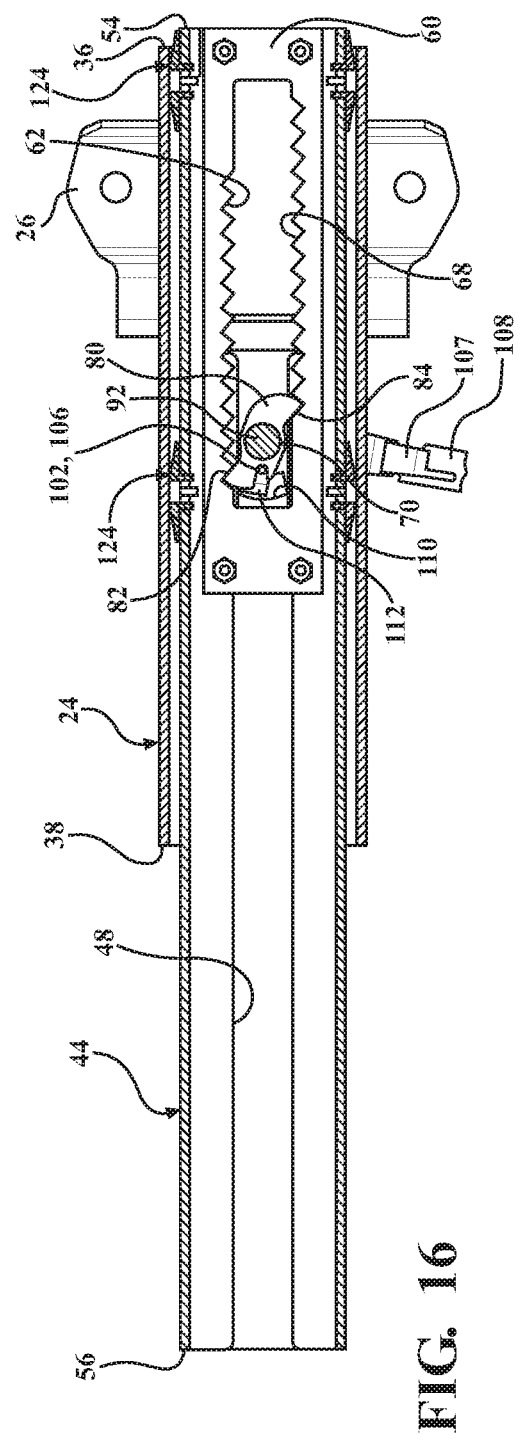
FIG. 16 is a cross-sectional, plan view of a portion of the grab bar assembly showing the latch in the lock position to fix the grab bar and the inner beam in the other location relative to the support beam.

The post 92 defines a center axis C transverse to the longitudinal axis B, and the post 92 is rotatable about the center axis C. The latch 80 of the locking mechanism 70 is coupled to the post 92 between the first 96 and second 98 post ends, and the latch 80 is rotatable about the center axis C with the post 92 between the lock and release positions. As best shown in FIGS. 11, 12, and 16, in the lock position, the latch 80 engages the locking plate 60 to fix the grab bar 22 (and the inner beam 44) in a location relative to the support beam 24. The locking mechanism 70 further includes a biasing member 102 coupled to the latch 80 to bias the latch 80 toward the lock position. In an embodiment, the biasing member 102 is further defined as a helical torsion spring having a head 104 disposed about the post 92 and sandwiched between the base 90 and the locking plate 60. The biasing member 102 further has arms 106, with one of the arms 106 configured to interact with base 90 and the other one of the arms 106 configured to interact with the latch 80 (disposed in the slot 89 of the latch 80) to bias the latch 80 toward engagement with the locking plate 60 (i.e., toward the lock position). As best shown in FIG. 14, in the release position, the latch 80 is moved in a direction opposite the biasing force and disengages the locking plate 60. Disengagement of the locking plate 60 by the latch 80 permits adjustment of the grab bar 22 and the inner beam 44 along the longitudinal axis B in one of the first $D_1$ and second $D_2$ directions.

The locking mechanism 70 further has the lever 108 coupled to the latch 80 and configured to rotate the latch 80 between the lock and release positions. In an embodiment, the lever 108 is attached to the post 92 at the first post end 96, such as by a fastener 109, and the lever 108 is configured to be actuated to rotate the post 92. The rotation of the post 92 effects rotation of the latch 80 coupled to the post 92 between the lock and release positions. As best shown in FIG. 1, at least a portion of the lever 108 extends outwardly from the support beam 24 and is exposed within the passenger-side of the vehicle 10. In instances where the vehicle 10 includes the shroud 18, the lever 108 extends through an opening or slot defined in the shroud 18 and is at least partially exposed within the passenger-side of the vehicle 10. In an embodiment, the locking mechanism 70 further includes a grip 107 disposed at least partially over the portion of the lever 108 extending outwardly from the support beam 24 and is accessible to the passenger of the vehicle 10. The grip 107 may have any suitable length, width, and/or configuration. It should be noted that the grip 107 has been removed from FIGS. 2-8 and 10.

The lever 108 is movable between a rest position and an actuated position. The lever 108 is in the rest position when the lever 108 has not been actuated, and the lever 108 is in the actuated position when the lever 108 has been actuated. The lever 108 may be manually actuated, by the passenger of the vehicle 10 for example, for actuating movement of the latch 80 from the lock position to the release position to permit adjustment of the inner beam 44 and the grab bar 22 relative to the support beam 24. This is accomplished by the passenger by manually moving the lever 108 (such as by grasping the grip 107 and physically moving the lever 108) from the rest position to the actuated position. Typically, the lever 108 is moved in a direction toward the grab bar 22 (or towards the passenger seat 14 of the vehicle 10) to actuate the locking mechanism 70. It should be appreciated that the locking mechanism 70 could be arranged such that the lever 108 is configured to move away from the grab bar 22 (or away from the passenger seat 14 of the vehicle 10) to actuate movement of the latch 80 and adjust the location of the grab bar 22 relative to the support beam 24.

As previously mentioned, the base 90 defines the opening 110 and the lever 108 has a tab 112 extending into the opening 110. The lever 108 has first 114 and second 116 lever ends, with the first lever end 114 attached to the post 92 and the second lever end 116 extending into the passenger side of the vehicle 10. The tab 112 extends from the lever 108 proximate the first lever end 114. Additionally, the tab 112 has an L-shaped configuration so that the tab 112 curves toward the base 90 and into the opening 110.

Figure 13:
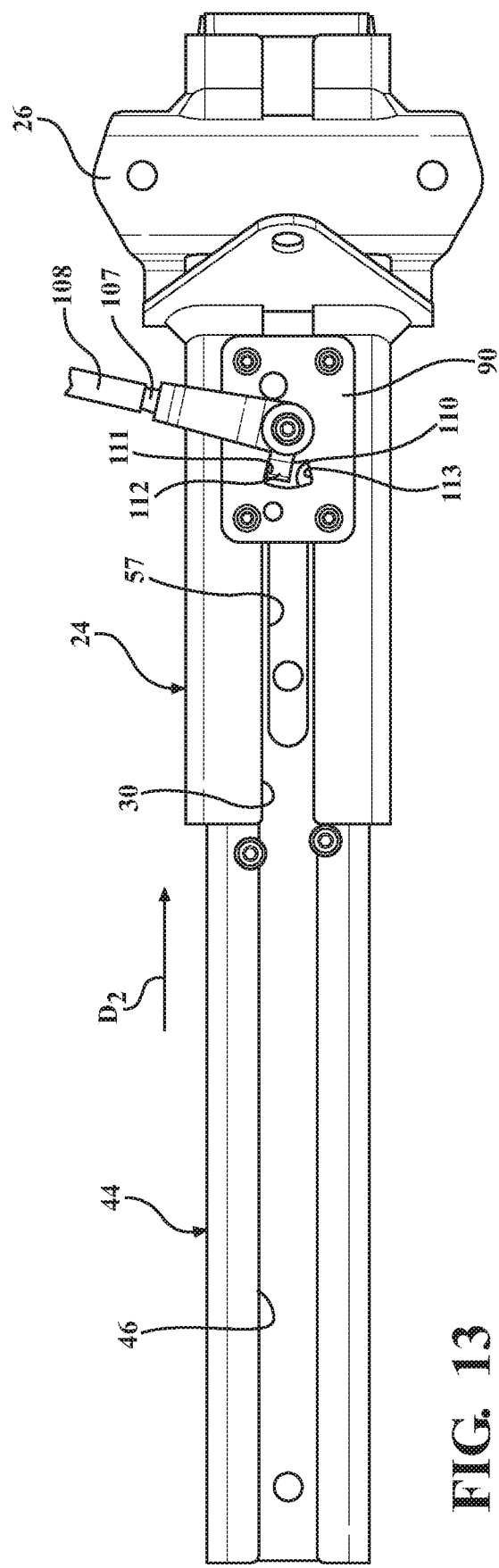
FIG. 13 is a plan view showing a portion of the grab bar assembly including the lever in an actuated position and the inner beam and grab bar movable along a longitudinal axis relative to the support beam.
Figure 15:
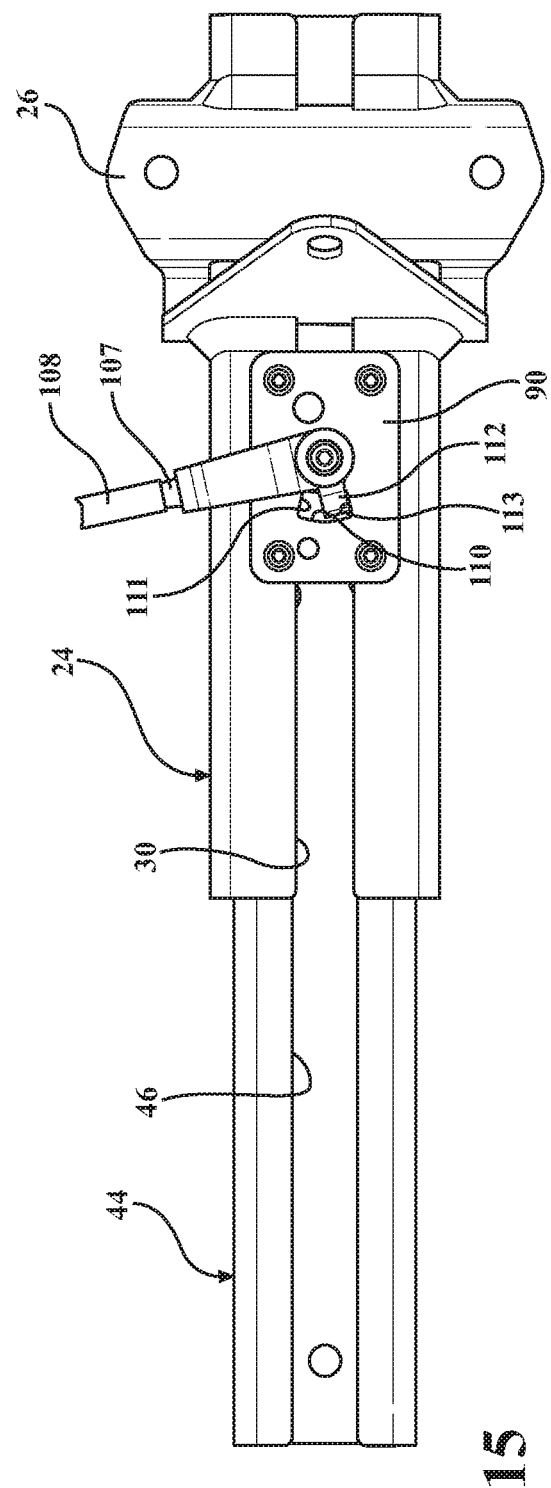
FIG. 15 is a plan view showing a portion of the grab bar assembly including the lever in the rest position and the inner beam and grab bar fixed in another location relative to the support beam.

The opening 110 of the base 90 has a curved configuration, and the tab 112 of the lever 108 is movable with movement of the lever 108 from one side of the opening 110 to the other. FIG. 15 shows the lever 108 in the rest position and the tab 112 positioned at a first end 111 of the opening 110. When the lever 108 is actuated, the tab 112 follows the movement of the lever 108 and moves along the curve of the opening 110 to a second end 113 of the opening 110. This is shown in FIG. 13. Additionally, the distance that the lever 108 moves from the rest position is limited by the size of the opening 110. In other words, each end 111, 113 of the opening 110 defines a stop that the tab 112 engages when the lever 108 is moved between the rest and actuated positions, thereby restricting the distance that the lever 108 can move when actuated.

Operation of the grab bar assembly 20, particularly to adjust the location of the grab bar 22 relative to the support beam 24 (which is fixed to the vehicle 10, such as to the dashboard 12 of the vehicle 10) is described below with reference to FIGS. 11-16. Notably, the handle 42 of the grab bar 22 has been removed from FIGS. 13-16 for purposes of simplifying the figures. FIGS. 11 and 12 show a portion of the grab bar assembly 22 with the pawl 80 of the locking mechanism 70 biased toward the lock position and the inner beam 44 in a first location relative to the support beam 24. When in the lock position, the pawl 80 engages the locking plate 60. For example, the first latch surface 82 of the latch (pawl) 80 is in direct contact one of the first series of detents 62 and the second latch surface 84 is in direct contact with one of the second series of detents 68 to fix the inner beam 44 in a location relative to the support beam 24. In the example shown in FIGS. 11 and 12, the first 82 and second 84 latch surfaces of the pawl 80 engage the first detent of the first series of detents 62 and the second detent of the second series of detents 68 to fix the inner beam 44 at a most-extended location relative to the support beam 24.

It should be appreciated that FIGS. 2, 3, 9, 11, and 12 show the inner beam 44 fixed at the most-extended location relative to the support beam 24. FIG. 1 is also intended to show the inner beam 44 fixed at the same location as that shown in FIGS. 2, 3, 9, 11, and 12. Notably, when in the most-extended location, the handle 42 of the grab bar 22 extends toward the passenger seat 14 and is spaced from the shroud 18.

To adjust the location of the grab bar 22 relative to the support beam 24, and as shown in FIGS. 13 and 14, the passenger actuates the lever 108 of the locking mechanism 70, such as by simply grasping and moving the lever 108. As shown, the passenger moves the lever 108 toward the grab bar 22 (or toward the passenger seat 14 of the vehicle 10). In doing so, the lever 108 effects rotational movement of the post 92 in a direction against the bias force generated by the biasing member 102. The rotational movement of the post 92 causes rotational movement of the pawl 80 from the lock position to the release position. FIG. 14 shows the pawl 80 in the release position, in which the first 82 and second 84 latch surfaces are disengaged from the detents of the first 62 and second 68 series of detents. In particular, the first latch surface 82 is spaced from the first series of detents 62 and the second latch surface 84 is spaced from the second series of detents 68 when the latch (pawl) 80 is in the release position.

The passenger can adjust the location of the grab bar 22 by grasping and moving the grab bar 22 and inner beam 44 in first $D_1$ and second $D_2$ directions relative to the support beam 24. In the example shown in FIGS. 13 and 14, the inner beam 44 is moved toward the support beam 24 (and toward the dashboard 12 of the vehicle 10) when the inner beam 44 is moved in the second direction $D_2$. In this example, the inner beam 44 is disposed deeper within the cavity 28 of the support beam 24 to shorten the portion of the inner beam 44 outside of the cavity 28 and exposed within the passenger side of the vehicle 10. In another example, which is not illustrated in the figures, the inner beam 44 can be moved away from the support beam 24 (and away from the dashboard 12 of the vehicle 10) when the inner beam 44 is moved in the first direction $D_1$. In this example, the inner beam 44 is not disposed as deep within the cavity 28 of the support beam 24 to lengthen the portion of the inner beam 44 outside of the cavity 28 and exposed within the passenger side of the vehicle 10.

In an embodiment, movement of the inner beam 44 relative to support beam 24 is restricted or limited by the length of the opening 69 of the locking plate 60. For example, the post 92, which extends through the opening 69, is configured to interact with the first 74 and second 76 stops to limit movement of the grab bar 22 and the inner beam 44 relative to the support beam 24 along the longitudinal axis B. Additionally, the opening 57 of the inner beam 44, through which the post 92 also extends, also serves to limit the movement of the inner beam 44 relative to the support beam 24. In an embodiment, the respective lengths of the opening 57 of the inner beam 44 and the opening 69 of the locking plate 60 are about the same, such that movement of the inner beam 44 is limited by both of the openings 57 and 69.

Typically, the passenger maintains pressure on the lever 108 to keep the pawl 80 in the release position as the passenger moves the inner beam 44 in the first $D_1$ and second $D_2$ directions when adjusting the location of the grab bar 22 and the inner beam 44. Once the passenger has set the inner beam 44 to the desired location relative to the support beam 24, the passenger releases pressure from the lever 108 (such as by releasing his/her grip on the lever 108 itself) and the bias force generated by the biasing member 102 causes the pawl 80 to automatically move to the lock position. In this way, the telescoping beams 24, 44 are considered to be self-locking. This is shown in FIGS. 15 and 16. When the latch (pawl) 80 is in the lock position, the first latch surface 82 is in direct contact with another one of the first series of detents 62 and the second latch surface 84 is in direct contact with another one of the second series of detents 68. The grab bar 22 and the inner beam 44 are in the adjusted location relative to the support beam 24 when the latch (pawl) 80 is in the lock position.

It should be appreciated that FIGS. 15 and 16 show the inner beam 44 fixed at the most-contracted (or least-extended) location relative to the support beam 24. When in this location, and with reference to but not specifically shown in FIG. 1, the handle 42 of the grab bar 22 would be adjacent to or even flush with the shroud 18.

Additionally, FIGS. 11, 14, and 16 show the latch 80 engaging the locking plate 60 at the extreme ends of the first 62 and second 68 series of locking positions. It should be appreciated that the latch 80 also engages the locking plate 60 at locking positions between the extreme ends of the first 62 and second 68 series of locking positions for smaller, incremental adjustment(s) of the location of the grab bar 22 and the inner beam 44 relative to the support beam 24.

Referring to FIGS. 2-9, 17, and 18, the grab bar assembly 20 further includes a bushing 124 coupled to one of the inner 44 and support 24 beams. The bushing 124 is formed as a single piece from any suitable material, such as a polymeric material. As best shown in FIGS. 17 and 18, the bushing 124 has a body 126 seated against one of the inner 44 and support 24 beams and in contact with another one of the inner 44 and support 24 beams. The body 126 has a main portion 128 seated against one of the inner 44 and support 24 beams. The main portion 128 has opposing first 130 and second 132 ends and opposing first 134, second 136, third 138, and fourth 140 sides. The first side 134 is opposite the second side 136, and the third side 138 is opposite the fourth side 140. The main portion 128 further has opposing first 142 and second 144 surfaces. The main portion 128 may have any suitable size and/or configuration.

The bushing 124 further has a locking finger 146 extending transverse to the body 126 and configured to engage the one of the inner 44 and support 24 beams to attach the bushing 124 to the one of the inner 44 and support 24 beams. In an embodiment, the locking finger 146 is one of a plurality of locking fingers 146 each extending transverse to the body 126 and configured to engage the one of the inner 44 and support beams 24. Further, the plurality of locking fingers 146 extend substantially parallel to one another. In the illustrated embodiment, the bushing 124 has two locking fingers 146 arranged opposite one another. Alternatively, the bushing 124 could have any number of locking fingers 146.

The bushing 124 is described in detail below as being attached to the inner beam 44 with the body 126 seated against the exterior surface 52 of inner beam 44, as shown in FIGS. 4-8. The locking finger(s) 146 extends from the body 126 of the bushing 124 and through the aperture 59 of the inner beam 44. The locking finger(s) 146 is configured to engage the interior surface 50 of the inner beam 44 to attach the bushing 124 to the inner beam 44. Alternatively, the bushing 124 could be configured to be attached to the support beam 24 with the body 126 seated against the interior surface 32 of support beam 24. In this alternative embodiment, the locking finger(s) 146 extends from the body 126, through an aperture defined in the support beam 24, and configured to engage the exterior surface 34 of the support beam 24 to attach the bushing 124 to the support beam 24.

Referring again to FIGS. 17 and 18, each locking finger 146 has a stem 148 and a head 150 defining an engaging surface 152. The stem 148 may have any suitable configuration and any suitable length. In an embodiment, the length of the stem 148 corresponds to the thickness of the inner beam 44. Additionally, the stem 148 may have a curved portion 154 that follows or corresponds to the curve of the aperture 59 through which the stem 148 is disposed. The curved portion 154 of the stem 148 is positioned against the curved edge of the inner beam 44 defining the aperture 59. The stem 148 further has a flat portion 156 opposite the curved portion 154.

The head 150 of the locking finger 146 may have any suitable configuration and defines the engaging surface 152. As shown, the engaging surface 152 faces and is configured to engage the interior surface 50 of the inner beam 44 to secure the bushing 124 to the inner beam 44. When attaching the bushing 124 to the inner beam 44, the stem 148 is configured to flex inwardly toward the center of the aperture 59 as the head 150 of the locking finger 146 passes through the aperture 59, and then snap outwardly once the head 150 has passed through the aperture 59. Movement of the stem 148 in the outward direction is restricted by the curved edge of the inner beam 44 defining the aperture 59. When the stem 148 snaps outwardly, the engaging surface 152 of the head 150 engages the interior surface 50 of the inner beam 44 to attach the bushing 124 to the inner beam 44.

The bushing 124 further has a locator 158 extending from the body 126 and through the aperture 59 of the inner beam 44 to maintain a position of the bushing 124 relative to the inner beam 44. The locator 158 may have any configuration and any suitable length. The length of the locator 158 is also substantially the same as the length of the stem 148 of the locking finger 146. In an embodiment, the locator 158 has a curved configuration that follows or corresponds to the curved edge of the inner beam 44 defining the aperture 59. The bushing 124 may have any number of locking fingers 146 and any number of locators 158. As shown, the bushing 124 has two locators 158 and two locking fingers 146 in an alternating arrangement. Additionally, the locator(s) 158 are spaced from the adjacent locking finger(s) 146 to enable the stem 148 of the locking finger(s) 146 to properly flex when the bushing 124 is secured to the inner beam 44.

The bushing 124 further has at least one limb 160 extending from the main portion 128. In an embodiment, the at least one limb 160 is further defined as a first limb 160 extending from the first side 134, and the bushing 124 further has a second limb 162 extending from the second side 136 of the main portion 128. Each of the first 160 and second 162 limbs has a curved configuration in cross section. In an embodiment, each of the first 160 and second 162 limbs has a configuration that follows or corresponds with the configuration of at least a portion of the cross-sectional configuration of the inner beam 44. For example, and as shown in FIGS. 17 and 18, each of the first 160 and second 162 limbs has a partial (such as a quarter) rectangular-shaped configuration corresponding to the portion of the rectangular-shaped configuration of the inner beam 44. It should be appreciated that the limbs 160, 162 can have any configuration in cross section depending on the cross-sectional configuration of the inner beam 44. For instance, each of the limbs 160, 162 could have a quarter-circular configuration in cross section following or corresponding to an inner beam 44 having a circular or annular configuration in cross section.

Each of the first 160 and second 162 limbs have first 164 and second 166 limb ends. The first limb end 164 of the first limb 160 is integral with the first side 134 of the main portion 128 of the bushing 124. The first limb end 164 of the second limb 162 is integral with the second side 136 of the main portion 128 of the bushing 124.

The bushing 124 further has at least one spring 167 coupled to the body 126. In an embodiment, the at least one spring 167 is further defined as a first spring 167 and the bushing 124 further has a second spring 168 also coupled to the body 126. As shown, the first spring 167 is coupled to (such as integral with) the second limb end 166 of the first limb 160, and the second spring 168 is coupled to (such as integral with) the second limb end 166 of the second limb 162. Each of the first 166 and second 168 springs has a center portion 170 and at least one leg 172 extending from the center portion 170. In the illustrated embodiment, the center portion 170 has first 174 and second 176 opposing sides, and the at least one leg 172 is further defined as a first leg 172 extending from the first side 174 of the center portion 170. Each of the first 167 and second 168 springs further has a second leg 178 extending from the second side 176 of the center portion 170.

The at least one leg 172 is in direct contact with the one of the inner 44 and support 24 beams to bias the center portion 170 into direct contact with the other one of the inner 44 and support 24 beams to form a close sliding fit between the inner 44 and support 24 beams. In the illustrated embodiment, where the bushing 124 is attached to the inner beam 44, the body 126 of the bushing 124 is seated against the inner beam 44. The bushing 124 has the first 167 and second 168 springs with the first spring 167 coupled to the first limb 160, and has the center portion 170 and the at least one leg 172 extending from the center portion 170 and in direct contact with the exterior surface 52 of the inner beam 44 to bias the center portion 170 of the first spring 167 in direct contact with the interior surface 32 of the support beam 24 to form the close sliding fit between the inner 44 and support 24 beams. The second spring 168 is coupled to the second limb 162 and has the center portion 170 and the at least one leg 172 extending from the center portion 170 and in direct contact with the exterior surface 52 of the inner beam 44 to bias the center portion 170 of the second spring 168 in direct contact with the interior surface 32 of the support beam 24 to form the close sliding fit between the inner 44 and support 24 beams. As used herein, the term close sliding fit describes a type of clearance fit between the inner 44 and support 24 beams where, by the presence of the bushing 124, the inner beam 44 is capable of moving within the cavity 28 relative to the support beam 24 along the longitudinal axis B by pushing or pulling. With a close sliding fit, the inner beam 44 does not move transverse to the longitudinal axis B and/or rotate freely within the cavity 28 relative to the support beam 24. Additionally, the close sliding fit enables movement of the inner beam 44 without excessive lash while adjusting the location of the inner beam 44 relative to the support beam 24.

In an embodiment, the bushing 124 further includes third 180 and fourth 182 springs. The third spring 180 is coupled to and extends from the third side 138 of the main portion 128 of the body 112, and the fourth spring 182 is coupled to and extends from the fourth side 140 of the main portion 128 of the body 112. Both of the third 180 and fourth 182 springs are biased inwardly toward the inner beam 44. The bushing 124 further has a wear strip 186 formed on the body 126 and in direct contact with the interior surface 32 of the support beam 24. In an embodiment, the bushing 124 has a plurality of wear strips 186 formed on the body 126. The bushing 124 may also have a wear strip 186 formed on the center portion 170 of each of the springs 167, 168. The wear strips 186 allow for some clearance to prevent debris from being trapped between the beams 24, 44.

Figure 7:
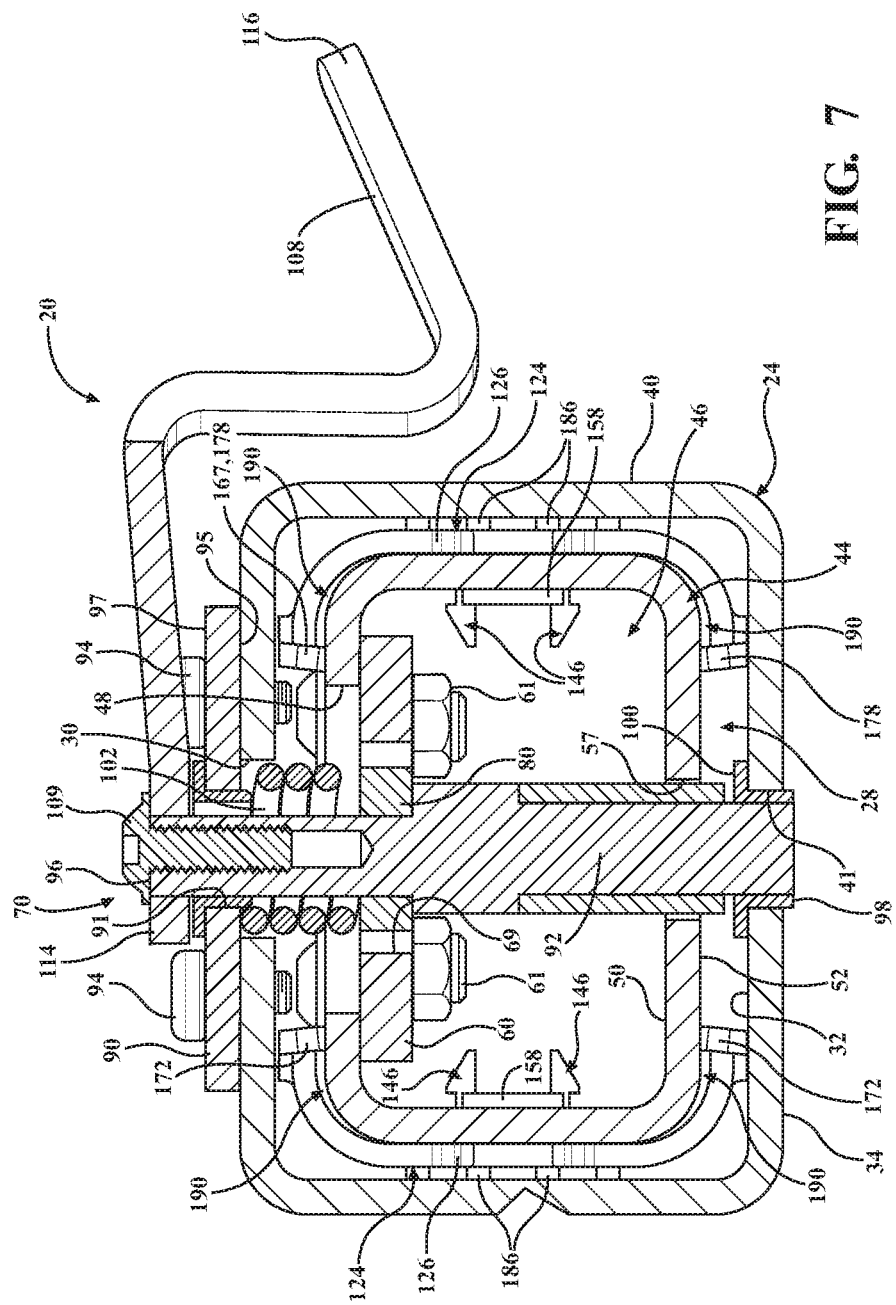
FIG. 7 is a cross-sectional view of the grab bar assembly taken along line 7-7 of FIG. 3.
Figure 8:
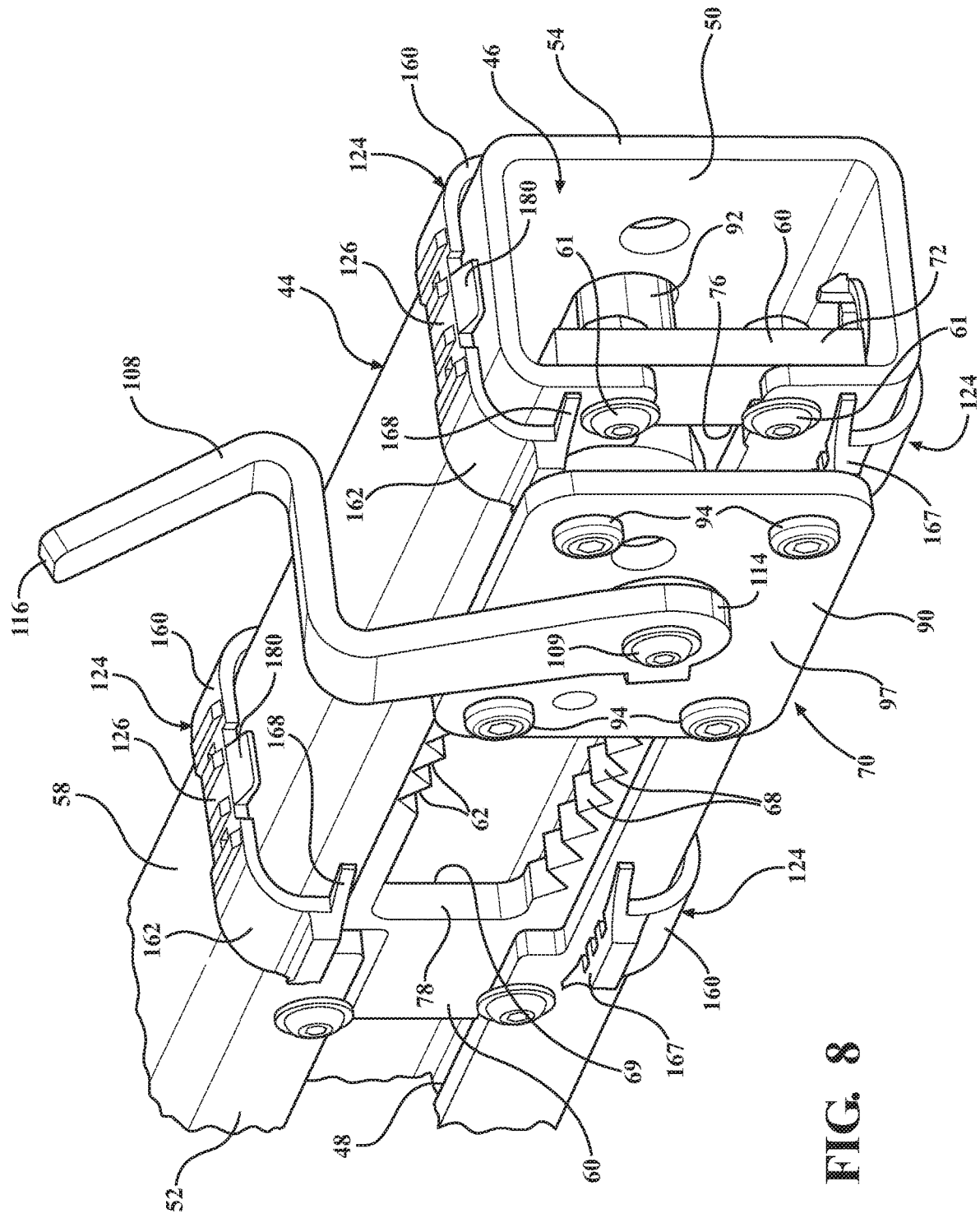
FIG. 8 is perspective view of a portion of the grab bar assembly with the handle of the grab bar and the support beam removed.

Referring to FIGS. 5 and 7, with the bushing 124 attached to the inner beam 44 and the inner beam 44 disposed within the cavity 28 of the support beam 24, the main portion 128 of the body 126 of the bushing 124 directly contacts the interior surface 32 of the support beam 24 and flexes inwardly toward the exterior surface 52 of the inner beam 44. This causes the locking fingers 146 (and the locators 158) to move inwardly such that the engaging surface 152 disengages the interior surface 50 of the inner beam 44, as shown in FIGS. 5 and 7. At the same time, the at least one limb 160, 162 extending from the main portion 128 is spaced from the inner support beam 24 to form a gap 190. As the inner beam 44 is moved relative to the support beam 24 (for adjustment of the location of the grab bar 22 and the inner beam 44 relative to the support beam 24), the gap 190 permits the at least one limb 160, 162 to flex to enable the at least one spring 167, 168 to maintain the close sliding fit between the inner 44 and support 24 beams. This obviates the need for a tight tolerance between the interior surface 32 of support beam 24 and the exterior surface 52 of the inner beam 44 in order to maintain the close sliding fit between the two telescoping beams 24, 44. Additionally, the first 167 and second 168 springs (as well as the third 180 and fourth 182 springs) are self-adjusting to accommodate tolerance(s) and wear of the telescoping beams 24, 44 over time, as well as dampen vibration between the two beams 24, 44 when the vehicle 10 is in operation.

The invention has been described in an illustrative manner, and it is be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. A grab bar assembly for a vehicle comprising:
a support beam defining a longitudinal axis and a cavity extending along said longitudinal axis with said support beam adapted to be mounted to the vehicle;
a grab bar having an inner beam disposed within said cavity of said support beam with said inner beam movable relative to said support beam in first and second directions along said longitudinal axis;
a locking plate attached to said inner beam and movable with said inner beam during said movement of said inner beam; and
a locking mechanism coupled to said support beam and having a latch movable between a lock position engaging said locking plate to fix said grab bar in a location relative to said support beam and a release position disengaging said locking plate to permit adjustment of said grab bar and said inner beam along said longitudinal axis in one of said first and second directions.

2. The grab bar assembly as set forth in claim 1 wherein said support beam defines a support beam slot formed therein along said longitudinal axis and said inner beam defines an inner beam slot formed therein along said longitudinal axis and aligned with said support beam slot with said locking mechanism extending through said inner and support beam slots.

3. The grab bar assembly as set forth in claim 2 wherein said inner beam has first and second inner beam ends with said an inner beam slot extending from said first inner beam end to said second inner beam end, and said support beam has first and second support beam ends with said support beam slot extending from said first support beam end to said second support beam end.

4. The grab bar assembly as set forth in claim 2 wherein said support beam is formed of at least one wall defining a C-shaped configuration in cross-section and said inner beam is formed of least one wall defining a C-shaped configuration in cross-section and further comprising a bushing coupled to one of said inner and support beams with said bushing having a body seated against one of said inner and support beams and in contact with another one of said inner and support beams, with said bushing further having at least one locking finger extending transverse to said body with said locking finger configured to engage said one of said inner and support beams to attach said bushing to said one of said inner and support beams and said bushing having at least one spring coupled to said body with said spring having a center portion and at least one leg extending from said center portion with said at least one leg in direct contact with said one of said inner and outer support beams to bias said center portion in direct contact with said other one of said inner and support beams to form a close sliding fit between said inner and support beams.

5. The grab bar assembly as set forth in claim 1 wherein said inner beam defines an inner cavity and an inner beam slot with said locking plate disposed within said inner beam cavity adjacent said inner beam slot, and said support beam defines a support beam slot aligned with said inner beam slot with said locking mechanism extending through said aligned slots to engage said locking plate.

6. The grab bar assembly as set forth in claim 1 wherein said locking mechanism further has a lever coupled to said latch and configured to rotate said latch between said lock and release positions.

7. The grab bar assembly as set forth in claim 1 wherein said latch is further defined as a pawl movable between said lock and release positions and said locking mechanism further has a lever coupled to said pawl and configured to rotate said pawl between said lock and release positions.

8. The grab bar assembly as set forth in claim 1 wherein said locking mechanism further has a biasing member coupled to said latch to bias said latch toward said lock position.

9. The grab bar assembly as set forth in claim 1 wherein said latch is further defined as a pawl rotatable between said lock and release positions with said pawl having a latch surface configured to engage said locking plate to fix said inner beam to said support beam at said location along said longitudinal axis.

10. The grab bar assembly as set forth in claim 9 wherein said locking plate defines a plurality of discrete locking positions with said latch surface configured to engage one of said plurality of discrete locking positions to fix said grab bar and said inner beam relative to said support beam in said location along said longitudinal axis.

11. The grab bar assembly as set forth in claim 10 wherein said locking plate has opposing first and second ends and defines a first stop proximate said first end and a second stop proximate said second end with said locking mechanism configured to interact with said first and second stops to limit movement of said grab bar and said inner beam relative to said support beam along said longitudinal axis.

12. The grab bar assembly as set forth in claim 10 wherein said plurality of discrete locking positions is further defined as a first series of discrete locking positions arranged along said longitudinal axis and said locking plate further defines a second series of discrete locking positions arranged along said longitudinal axis, opposite said first series of discrete locking positions, and spaced from said first series of discrete locking positions, and said latch surface of said pawl is further defined as a first latch surface and said pawl further having a second latch surface with said first latch surface configured to engage one locking position of said first series of discrete locking positions and said second latch surface configured to engage one locking position of said second series of discrete locking positions to fix said grab bar and said inner beam relative to said support beam in said location along said longitudinal axis.

13. The grab bar assembly as set forth in claim 12 wherein said locking plate has a length extending along said longitudinal axis with each of said first and second series of discrete locking positions extending along said length but offset from one another and when said pawl is in said lock position, said one locking position of said first series of discrete locking positions engaged by said first latch surface is offset along said length from said one locking position of said second series of discrete locking positions engaged by said second latch surface.

14. The grab bar assembly as set forth in claim 1 wherein said support beam defines a support beam slot and said inner beam defines an inner beam slot aligned with said support beam slot and said locking mechanism further has a base fixed to said support beam, a post extending from said base through said aligned support and inner beam slots, a lever coupled to and configured to rotate said post, and said latch coupled to and rotatable with said post, and said locking plate has first and second opposing ends and defines a first stop proximate said first end and a second stop proximate said second end with said post configured to interact with said first and second stops to limit movement of said grab bar and said inner beam relative to said support beam along said longitudinal axis.

15. A system for attaching a grab bar to a vehicle, with said system comprising:
a support beam defining a longitudinal axis and a cavity extending along said longitudinal axis with said support beam adapted to be mounted to the vehicle;
an inner beam disposed within said cavity of said support beam with said inner beam movable relative to said support beam in first and second directions along said longitudinal axis; a locking plate attached to said inner beam and movable with said inner beam during said movement of said inner beam; and
a locking mechanism coupled to said support beam and having a latch movable between a lock position engaging said locking plate to fix said grab bar in a location relative to said support beam and a release position disengaging said locking plate to permit adjustment of said grab bar and said inner beam along said longitudinal axis in one of said first and second directions.

16. The system as set forth in claim 15 wherein said inner beam defines an inner beam slot formed therein along said longitudinal axis and said support beam defines a support beam slot formed therein along said longitudinal axis and aligned with said inner beam slot, with said locking mechanism extending through said inner and support beam slots.

17. A system for attaching a grab bar to a vehicle, with said system comprising:
a support beam defining a longitudinal axis and a cavity extending along said longitudinal axis with said support beam adapted to be mounted to the vehicle;
an inner beam disposed within said cavity of said support beam with said inner beam movable relative to said support beam in first and second directions along said longitudinal axis; and
a bushing attached to one of said inner and support beams with said bushing having: a body seated against said one of said inner and support beams and in contact with the other one of said inner and support beams,
a locking finger extending transverse to said body with said locking finger configured to engage said one of said inner and support beams to attach said bushing to said one of said inner and support beams, and
at least one spring coupled to said body with said spring having a center portion and at least one leg extending from said center portion with said at least one leg in direct contact with said one of said inner and support beams to bias said center portion in direct contact with said other one of said inner and support beams to form a close sliding fit between said inner and support beams.

18. The system as set forth in claim 17 wherein said body of said bushing has a main portion seated against said one of said inner and support beams and said body further having at least one limb extending from said main portion and spaced from said one of said inner and support beams to form a gap to permit said at least one limb to flex to enable said spring to maintain said close sliding fit between said inner and support beams.

19. The system as set forth in claim 18 wherein said main portion has opposing first and second ends and said at least one limb is further defined as a first limb extending from said first end of said main portion and said body further having a second limb extending from said second end of said main portion, and
said at least one spring is further defined as a first spring coupled to said first limb and said bushing further having a second spring coupled to said second limb with said second spring having a center portion in direct contact with said other one of said inner and support beams and further having at least one leg extending from said center portion and in direct contact said one of said inner and support beams to form said close sliding fit between said inner and support beams.

20. The system as set forth in claim 17 wherein each of said inner and support beams has interior and exterior surfaces and said bushing is attached to said inner beam with said body seated against said exterior surface of said inner beam, said body of said bushing has a main portion seated against said inner beam and said body further having first and second limbs extending from said main portion,
said spring is further defined as a first spring coupled to said first limb having said center portion and said at least one leg extending from said center portion of said first spring and in direct contact with said exterior surface of said inner beam to bias said center portion of said first spring in direct contact with said interior surface of said support beam to form said close sliding fit between said inner and support beams, and
said bushing further having a second spring coupled to said second limb with said second spring having a center portion and at least one leg extending from said center portion of said second spring and in direct contact with said exterior surface of said inner beam to bias said center portion of said second spring in direct contact with said interior surface of said support beam to form a close sliding fit between said inner and support beams.

21. The system as set forth in claim 17 wherein said inner beam has exterior and interior surfaces and defines an aperture and said bushing is attached to said inner beam with said body seated against said exterior surface of said inner beam, with said locking finger extending from said body of said bushing and through said aperture of said inner beam and said locking finger configured to engage said interior surface of said inner beam to attach said bushing to said inner beam.

22. The system as set forth in claim 21 wherein said bushing further has a locator extending from said body of said bushing and through said aperture of said inner beam to maintain a position of said bushing relative to said inner beam.

23. The system as set forth in claim 21 wherein said support beam has interior and exterior surfaces and said bushing further has a wear strip formed on said body and in direct contact with said interior surface of said support beam.

\* \* \* \* \*